US011169730B2

(12) United States Patent
Boehm et al.

(10) Patent No.: US 11,169,730 B2
(45) Date of Patent: Nov. 9, 2021

(54) SCRUB RATE CONTROL FOR A MEMORY DEVICE

(71) Applicant: Micron Technology, Inc., Boise, ID (US)

(72) Inventors: Aaron P. Boehm, Boise, ID (US); Debra M. Bell, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 16/433,891

(22) Filed: Jun. 6, 2019

(65) Prior Publication Data

US 2020/0387323 A1    Dec. 10, 2020

(51) Int. Cl.
*G11C 29/00*   (2006.01)
*G06F 3/06*    (2006.01)
*G06F 11/10*   (2006.01)

(52) U.S. Cl.
CPC .......... *G06F 3/0652* (2013.01); *G06F 3/0616* (2013.01); *G06F 3/0659* (2013.01); *G06F 3/0673* (2013.01); *G06F 11/1076* (2013.01)

(58) Field of Classification Search
None
See application file for complete search history.

(56) References Cited

U.S. PATENT DOCUMENTS

| 6,838,331 | B2* | 1/2005 | Klein | G06F 11/106 |
| | | | | 438/238 |
| 7,275,130 | B2* | 9/2007 | Klein | G06F 1/3275 |
| | | | | 711/105 |
| 8,255,772 | B1* | 8/2012 | Foley | G11C 29/52 |
| | | | | 714/764 |
| 2003/0135794 | A1 | 7/2003 | Longwell et al. | |
| 2003/0191888 | A1* | 10/2003 | Klein | G06F 11/106 |
| | | | | 711/105 |
| 2004/0243886 | A1* | 12/2004 | Klein | G11C 11/406 |
| | | | | 714/42 |

(Continued)

FOREIGN PATENT DOCUMENTS

| KR | 20190060258 A | 6/2019 |
| WO | 2017065802 A1 | 4/2017 |

OTHER PUBLICATIONS

ISA/KR, International Search Report and Written Opinion of the International Searching Authority, Int'l Appl. No. PCT/US2020/03266, dated Aug. 24, 2020, Korean Intellectual Property Office, Seo-gu, Daejeon, Republic of Korea, 15 pgs.

*Primary Examiner* — Guerrier Merant
(74) *Attorney, Agent, or Firm* — Holland & Hart LLP

(57) ABSTRACT

Methods, systems, and devices for scrub rate control for a memory device are described. For example, during a scrub operation, a memory device may perform an error correction operation on data read from a memory array of the memory device. The memory device may determine a quantity of errors detected or corrected during the scrub operation and determine a condition of the memory array based on the quantity of errors. The memory device may indicate the determined condition of the memory array to a host device. In some cases, the memory device may perform scrub operations based on one or more condition of the memory array. For example, as a condition of the memory array deteriorates, the memory device may perform scrub operations at an increased rate.

30 Claims, 11 Drawing Sheets

(56) References Cited

U.S. PATENT DOCUMENTS

| | | | |
|---|---|---|---|
| 2008/0239808 A1* | 10/2008 | Lin | G06F 11/106 |
| | | | 365/185.09 |
| 2011/0029807 A1* | 2/2011 | Fry | G06F 11/106 |
| | | | 714/5.1 |
| 2011/0041039 A1* | 2/2011 | Harari | G11C 29/76 |
| | | | 714/773 |
| 2011/0055468 A1 | 3/2011 | Gonzalez et al. | |
| 2011/0161784 A1* | 6/2011 | Selinger | G06F 11/1068 |
| | | | 714/768 |
| 2016/0188213 A1* | 6/2016 | Lin | G11C 16/3459 |
| | | | 711/103 |
| 2016/0378591 A1 | 12/2016 | Naeimi et al. | |
| 2017/0031753 A1* | 2/2017 | Chinnakkonda Vidyapoornachary | G06F 3/0679 |
| 2019/0188072 A1* | 6/2019 | Kim | G06F 11/106 |

* cited by examiner

SCRUB RATE CONTROL FOR A MEMORY DEVICE

BACKGROUND

The following relates generally to a system that includes at least one memory device and more specifically to scrub rate control for a memory device.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRA VI), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

In some cases, a memory device may be used within a system that specifies a high level of reliability. Such systems may include, for example, automotive or other systems in which safety is implicated. The health of a memory device may degrade over time, however, which may lead to unrecoverable memory errors or other problems.

DETAILED DESCRIPTION

Figure 1:
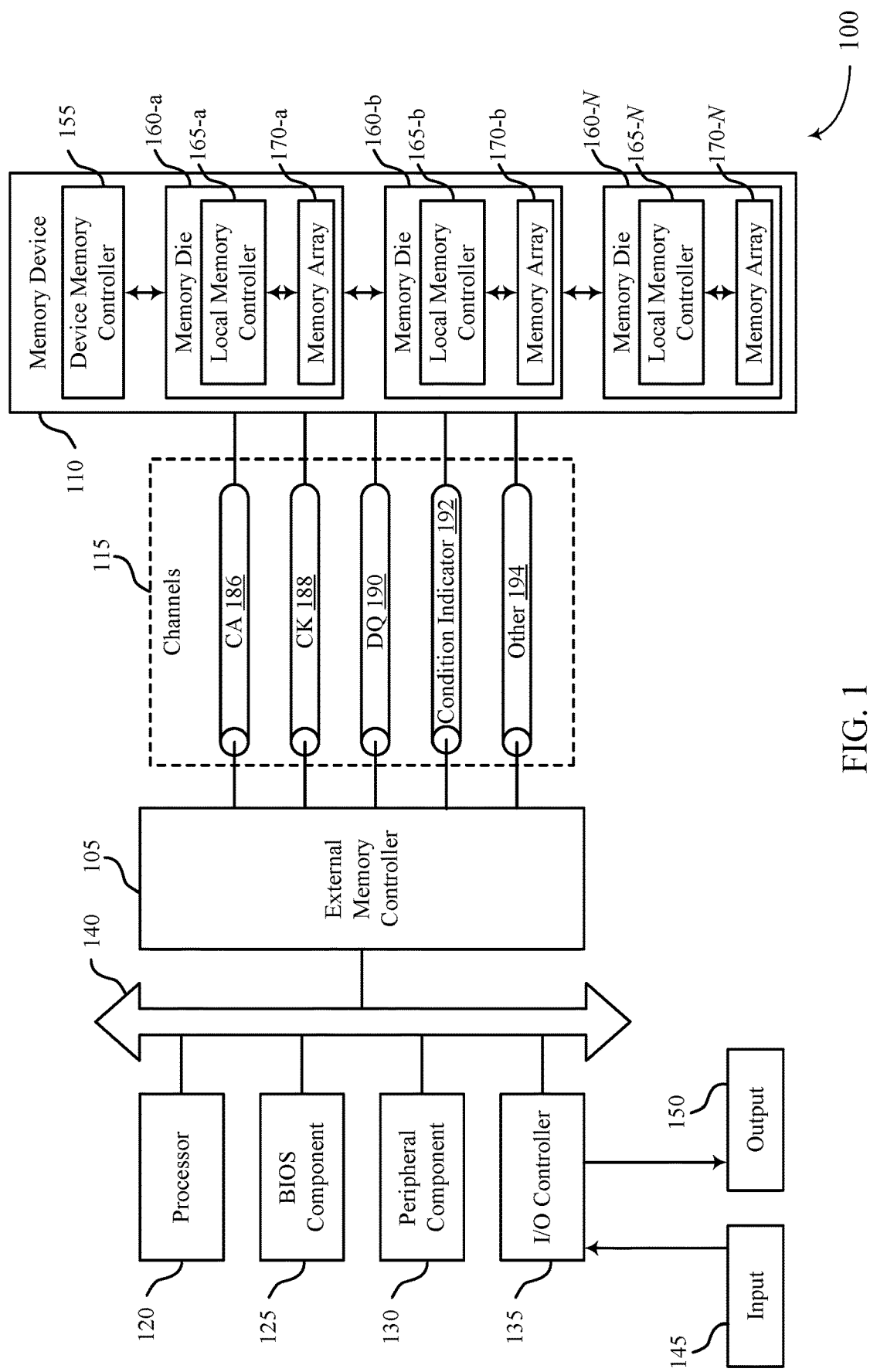
FIG. 1 illustrates an example of a system that supports scrub rate control for a memory device in accordance with examples as disclosed herein.

Memory devices may operate under various conditions as part of electronic apparatuses such as personal computers, wireless communication devices, servers, internet-of-things (IoT) devices, electronic components of automotive vehicles, and the like. In some cases, memory devices supporting applications for certain implementations (e.g., automotive vehicles, in some cases with autonomous or semi-autonomous driving capabilities) may be subject to increased reliability constraints. As such, memory devices (e.g., DRAM) for some applications may be expected to operate with a reliability subject to relatively higher industry standards or specifications (e.g., higher reliability constraints).

Data stored in a memory device may, in some cases, become corrupted (e.g., due to leakage, parasitic coupling, or electromagnetic interference (EMI)). Corruption of data may refer to an unintentional change in the logic value of data as stored within the memory device and thus may refer to an unintended change in the logic value stored by one or more memory cells (e.g., from a logic one (1) to a logic zero (0), or vice versa). For example, a memory device may perform a read operation to determine the logic value of data stored within the memory device and may output the logic values read from the memory cells. A deviation in the stored logic value of a bit from its original and intended logic value may be referred as an error, a bit error, or a data error and may result from corruption of stored voltage on memory cells. Some memory devices may be configured to internally detect and in at least some cases correct (repair) such data corruption or errors and thereby recover the data as stored before corruption. Such error detection and correction may rely upon one or more error-correcting codes (ECCs) (e.g., block codes, convolutional codes, Hamming codes, low-density parity-check codes, turbo codes, polar codes), and related processes, operations, and techniques may be referred as ECC processes, ECC operations, ECC techniques, or in some cases as simply ECC. Error detection and correction conducted internally within a memory device on data stored previously at the memory device may generally be referred to as internal or on-die ECC (whether within a single-die memory device or a multi-die memory device), and memory devices that support internal or on-die ECC may be referred to as ECC memory or on-die ECC memory. Other types of ECC may be performed in a memory system. For example, in-line ECC may refer to embedded ECC information (e.g., by a host device) within data stored in a memory device that is checked (e.g., or corrected) by the host device. That is, for in-line ECC, the memory device may be unaware of the ECC information and may treat both data and ECC information as data. In another example, extra ECC bits may accompany data in a data channel for read and/or write operations, and may be used to detect or correct errors that occur in transmission of data between a memory device and a host device. This type of ECC may be known as link ECC.

During the execution of a write command, a memory device with ECC memory may perform an error correction operation on data to be stored at a memory array (e.g., received from a host device) to generate error correction information corresponding to the data. The memory device may store the data and the error correction information at the memory array as part of the write operation. The memory device may be configured to scrub the memory array (e.g., according to a certain rate) in order to detect or correct errors within data stored at the memory array. The rate of performing scrub operations may correspond to a periodicity with which the entire memory array is scrubbed. To perform a scrub operation, the memory device may generate internal commands (e.g., memory commands and addresses) to scrub each row of the memory array. Alternatively, the memory device may receive one or more scrub commands from a host device indicating stages of the scrub operation. The scrub operation may include the memory device reading data, performing the error correction operation on the data (e.g., to detect errors within the data, to generate corrected data), and, in some cases, writing corrected data back to the memory array. A single scrub operation may correspond to the memory device scrubbing each of the rows of the memory array. Because the scrub operation may be able to correct errors before a quantity of errors builds up beyond the capability of the error correction operation, the scrub operation may increase the reliability of the memory device.

The quantity of detected or corrected errors determined during the execution of the scrub operation may indicate a condition of the memory array (e.g., corresponding to the integrity of data stored at the memory array). For example, detecting or correcting a relatively low quantity of errors during the scrub operation may indicate a good condition of the memory array (e.g., corresponding to a relatively high level of data integrity of the memory array). Alternatively, detecting or correcting a relatively high quantity of errors during the scrub operation may indicate a deteriorating or unsatisfactory condition of the memory array (e.g., corresponding to a relatively low level of data integrity of the memory array). In some cases, the memory device may indicate the condition of the memory array to a host device. Further, the rate for performing scrub operations may correspond to the condition of the memory array. For example, as the condition of the memory array degrades, the memory device may perform scrub operations according to a higher rate. Increasing the scrub rate based on the condition of the memory array may increase the reliability of the memory device.

Features of the disclosure are initially described in the context of a memory system and memory die as described with reference to FIGS. 1 through 3. Features of the disclosure are further described in the context of process flows as described with reference to FIGS. 4 and 5. These and other features of the disclosure are further illustrated by and described with reference to an apparatus diagram and flowcharts that relate to scrub rate control for a memory device as described with references to FIGS. 6 through 11.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor or printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory devices, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may, in some cases, be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine or more signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more condition indicator channels 192. A condition indicator channel 192 may indicate, to the external memory controller 105, a condition of one or more of the memory arrays 170. That is, the memory device 110 (e.g., by the device memory controller 155 or the local memory controller 165) may determine a condition of one or more of the memory arrays 170, where the condition of the memory array corresponds to a level of integrity of data stored at the memory arrays. The memory device 110 may determine a condition of the memory arrays 170 based on a quantity of errors detected during a scrub operation. For example, as the quantity of errors detected during a scrub operation increases, the memory device 110 may determine that the condition of the memory arrays are worsening. The memory device 110 may indicate the determined condition of the memory arrays 170 to the external memory controller 105 by the condition indicator channel 192. In some cases, the rate of scrubbing operations may be based on the condition indicated by the memory device 110 by the condition indicator channel 192. For example, as the condition of the memory arrays 170 degrade, the memory device 110 may perform scrub operations according to a higher rate. Increasing the scrub rate based on the condition of the memory arrays 170 may increase the reliability of the memory device 110.

In some cases, the channels 115 may include one or more other channels 194 that may be dedicated to other purposes. These other channels 194 may include any quantity of signal paths.

In some cases, the other channels 194 may include one or more write clock signal (WCK) channels. While the 'W' in WCK may nominally stand for "write," a write clock signal WCK (e.g., a WCK t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 194 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
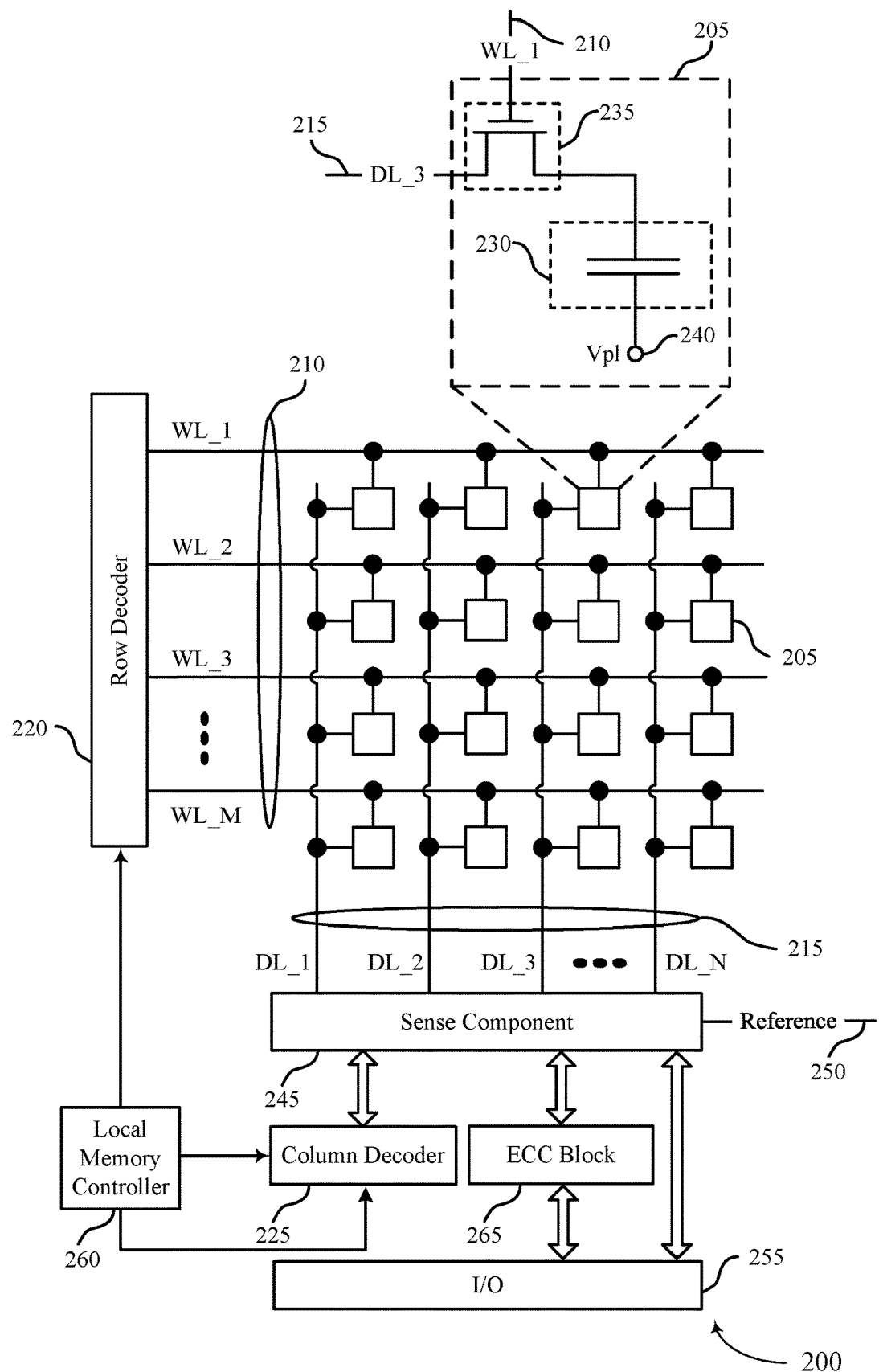
FIG. 2 illustrates an example of a memory die that supports scrub rate control for a memory device in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL N, where M and N depend on the size of the memory array. Thus, by activating a word line 210 and a digit line 215, e.g., WL_1 and DL 3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals.

For a read operation, the detected logic state of memory cell 205 may be output through ECC block 265 and I/O 255. Here, the ECC block 265 may perform an error correction operation on the detected logic state of memory cell 205 and output data (e.g., the original data or corrected data) via I/O 255. In some other cases, the detected logic state of memory cell 205 may bypass ECC block 265 and be output via I/O 255. In some cases, the detected logic state of memory cell 205 may be output through the ECC block 265 and around ECC block 265 by I/O 255. Here, the detected logic state of memory cell 205 may be output from the memory die 200 at a same time as ECC block 265 performs an error correction operation on the detected logic state of memory cell 205. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, sense component 245, ECC block 265). The local memory controller 260 may be an example of the local memory controller 165 described with reference to FIG. 1. In some cases, one or more of the row decoder 220, column decoder 225, sense component 245, and ECC block 265 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

The ECC block 265 or the local memory controller 260 may perform one or more error correction operations on data received from the host device as part of a write operation. For example, the ECC block 265 may receive data from the host device as part of a write operation. The ECC block 265 may determine or generate error correction information associated with the data. In some cases, the ECC block 265 may include error detection logic or may cause error detection logic (not shown) to perform the error detection operations described herein. The ECC block 265 may cause the data and the error correction information to be stored in one or more memory cells 205 as part of the write operation. In another example, the ECC block 265 may receive data and associated error correction information from a memory array as part of a read operation. The ECC block 265 may perform an error correction operation based on the data and the error correction information. Performing an error correction operation at the memory device (e.g., by the ECC block 265 or the local memory controller 260) may improve the reliability of the memory device.

The local memory controller 260 may be configured to scrub the memory die 200 (e.g., according to a certain rate) in order to detect or correct errors at one or more of the memory cells 205. The rate of performing scrub operations may correspond (e.g., inversely) to a periodicity with which an entire memory array (e.g., memory array 170) is scrubbed. To perform a scrub operation, the local memory controller 260 may generate internal commands (e.g., and addresses indicating one or more rows of the memory die 200) to scrub each row of the memory die 200. Alternatively, the local memory controller 260 may receive one or more scrub commands from a host device (e.g., an external memory controller is discussed with reference to FIG. 1) associated with the scrub operation. The scrub operation may include the local memory controller 260 initiating a read operation, the ECC block 265 performing the error correction operation on the data (e.g., to detect errors within the data, to generate corrected data), and, in some cases, the local memory controller 260 writing the corrected data back to the memory cells of the memory die 200. A single scrub operation may correspond to the local memory controller 260 scrubbing each of the rows of the memory die 200. The scrub operation may increase the reliability of the memory die 200 by correcting bit errors before they build up to a level that may not be able to be corrected by ECC block 265 based on the quantity of ECC bits stored with the data.

The quantity of detected or corrected errors determined during the execution of the scrub operation may indicate a condition of the memory die 200 (e.g., corresponding to the integrity of data stored at the memory die 200). For example, detecting or correcting a relatively low quantity of errors during the scrub operation may indicate a good condition of the memory die 200 (e.g., corresponding to a relatively high level of data integrity of the memory die 200). Alternatively, detecting or correcting a relatively high quantity of errors during the scrub operation may indicate a deteriorating or unsatisfactory condition of the memory die 200 (e.g., corresponding to a relatively low level of data integrity of the memory die 200). In some cases, the local memory controller 260 may indicate the condition of the memory array to a host device (e.g., via the I/O 255). Further, the rate for performing scrub operations may correspond to the condition of the memory die 200. For example, as the condition of the memory die 200 degrades, the local memory controller 260 may perform scrub operations according to a higher rate. Increasing the scrub rate based on the condition of the memory die 200 may increase the reliability of the memory die 200.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, activation of a word line in DRAM architectures may partially or completely discharge the capacitor of the target memory cell. The sense component 245 may restore the voltage on the digit line 215 according to the sensed logic state, which may restore the voltage on the memory cell 205 to a same or similar voltage as used in the write operation. However, if a bit error occurs, meaning that the sense component 245 detects a bit that was written to a first value (e.g., 0 or 1) as a second, different value, the activation of the word line and sense operation will restore the different or incorrect bit value. Thus, once bit errors occur, the incorrect values may be maintained in the memory cells until the data is corrected, either by on-die ECC (e.g., ECC block 265) or by a host controller reading out the data with the bit errors and writing back corrected data (e.g., using in-line ECC).

Figure 3:
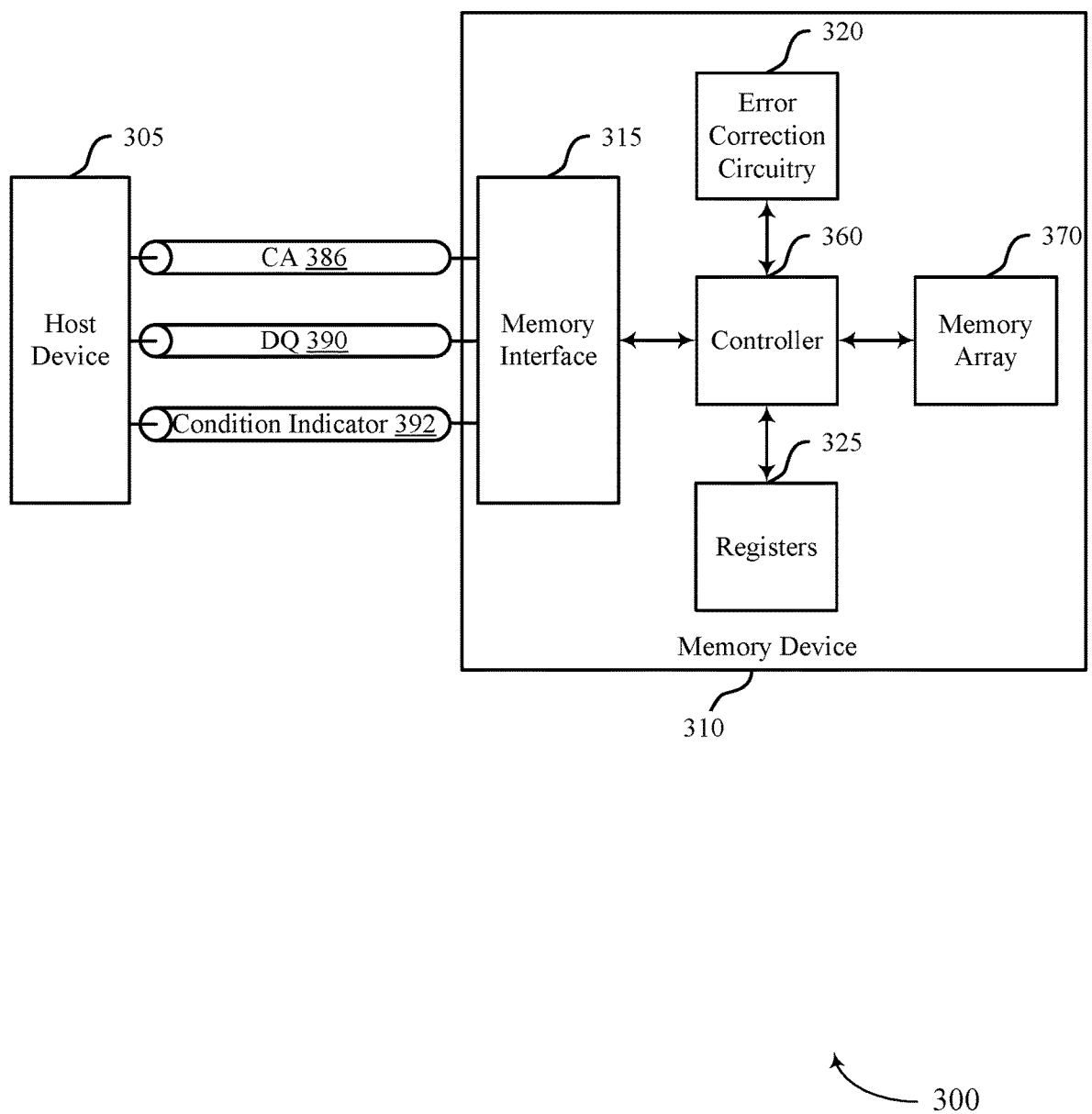
FIG. 3 illustrates an example of a system that supports scrub rate control for a memory device in accordance with examples as disclosed herein.

FIG. 3 illustrates an example of a system 300 that supports scrub rate control for a memory device in accordance with examples as disclosed herein. The system 300 may include one or more components described herein with reference to FIGS. 1 and 2, among others. For example, the system 300 may include a host device 305, which may be an example of the external memory controller 105 as described with reference to FIG. 1; a memory device 310, which may be an example of the memory device 110, the memory dice 160, or the memory die 200 as described with reference to FIGS. 1 and 2; a controller 360, which may be an example of the device memory controller 155, one or more local memory controllers 165, or the local memory controller 260 as described with reference to FIGS. 1 and 2, or any combination thereof; a memory array 370, which may be an example of the memory arrays 170 as described with reference to FIG. 1; error correction circuitry 320 which may be an example of the local memory controller 260 or the ECC block 265 as described with reference to FIG. 2; and CA channels 386, DQ channels, and condition indicator channels 392, which may be examples of the corresponding channels as discussed with reference to FIG. 1. The memory device 310 may also include memory interface 315 and registers 325.

Host device 305 may send commands to memory device 310 by CA channel 386, which may be received via the memory interface 315. The commands may include access commands to perform one or more access operations (e.g., a read operation, a write operation, a refresh operation, a scrub operation) at the memory array 370. The controller 360 may receive commands from the memory interface 315, process the commands, and execute the commands on memory array 370. The error correction circuitry 320 may perform one or more error correction operations on data associated with the access commands.

During a write operation, the host device 305 may send a write command to the memory interface 315 by CA channel 386. The write command may include data to be written to the memory array 370 (e.g., sent via DQ channel 390). The memory interface 315 may send the data to the controller 360 which may in turn communicate the data to the error correction circuitry 320. The error correction circuitry 320 may generate error correction information based on the data received from controller 360. For example, the error correction circuitry 320 may generate parity or Hamming code information based on the data. The error correction circuitry 320 may communicate the error correction information to the controller 360 to be stored at the memory array 370 with the data. The controller 360 may store the data at the memory array 370 (e.g., at a location indicated by the write command received from the host device 305). The controller 360 may also store the error correction information at the memory array 370. In some cases, the error correction information may be stored at a same location as the data (e.g., a same sub-array, a same row). In some other cases, the error correction information may be stored at a different portion of the memory array 370 than the data.

The memory device 310 may be configured to scrub the memory array 370 (e.g., according to a certain rate) in order to detect or correct errors within data stored at the memory array 370. When performing a scrub operation, the controller 360 may read data from each of the rows of the memory array 370. The controller 360 may also read error correction information (e.g., that is associated with the data) from the memory array 370. The controller 360 may communicate both the data and the error correction information to the error correction circuitry 320. The error correction circuitry 320 may perform an error correction operation based on the data to detect and/or correct errors associated with the data (e.g., due to leakage, parasitic coupling, or EMI). During the error correction operation, the error correction circuitry 320 may generate error correction information based on the data received from the controller 360. The error correction circuitry 320 may compare the received error correction information with the generated error correction information. In the event that the received error correction information and the generated error correction information do not match, the error correction circuitry 320 may detect an error. The error correction circuitry 320 may, in some cases, generate corrected data based on errors detected during the error correction operation.

In a case that the error correction circuitry 320 generated corrected data, the error correction circuitry 320 may further communicate the corrected data to the controller 360. Here, the controller 360 may communicate the corrected data to the memory array 370 to be stored at the memory array 370 (e.g., at a same row as the uncorrected data was previously stored). That is, the controller 360 may write the corrected data to the memory array 370.

In some cases, the memory device 310 may perform a scrub operation while performing other access operations. For example, the memory device 310 may perform refresh operations (e.g., based on refresh commands from the host device 305, based on refresh commands generated by the controller 360). The refresh operation may include the controller 360 reading data from the memory array 370, which may also restore the states of the memory cells of the memory array 370 (e.g., based on the states detected by the sense amplifiers). Thus, the refresh operation may write back the same data as was read from the memory array 370, regardless of bit errors. However, in some cases the controller 360 may perform a scrub operation while executing the refresh operation. Here, the controller 360 may communicate the data read from the memory array 370 for the refresh operation to the error correction circuitry 320. The error correction circuitry 320 may perform an error correction operation on the data read from the memory array 370 and communicate corrected data back to the controller 360. The controller 360 may write the corrected data back to the memory array 370, thus performing the scrub operation as part of or in addition to performing the refresh operation.

The error correction circuitry 320 may further communicate an indication of a quantity of detected errors during the error correction operation to the controller 360. The controller 360 may monitor the quantity of errors detected during each error correction operation to determine a quantity of errors detected during the scrub operation. The controller 360 may store the quantity of detected errors during the scrub operation at one of the registers 325. For example, registers 325 may store quantities of bit errors detected for the last N scrub operations. Registers 325 may be, for example, a first in, first out (FIFO) buffer.

Based on an error metric determined from the quantity of errors detected during the scrub operation, the controller 360 may determine a condition of the memory array 370. The condition of the memory array 370 may correspond to the integrity of data (e.g., a level of confidence of the accuracy of the data) stored at the memory array 370. For example, a first condition may correspond to a high level of integrity of the data stored at the memory array 370 while a second condition may correspond to a lower level of integrity of the data stored at the memory array 370. Each condition of the memory array 370 may be based on one or more thresholds. The thresholds may be preset (e.g., preconfigured) thresholds. Additionally or alternatively, the host device 305 may indicate the one or more thresholds to the controller 360. Here, the thresholds may be dynamic and configurable by the host device 305.

The controller 360 may determine the condition of the memory array 370 by comparing the error metric to one or more thresholds (e.g., defining one or more ranges of errors). For example, the controller 360 may utilize two thresholds to determine one of three possible conditions of the memory array 370. Here, if the error metric is less than a first threshold (e.g., one hundred (100)), the controller 360 may determine that the memory array is associated with a first condition. Further, if the error metric is between the first threshold and a second threshold (e.g., one thousand (1000)), the controller 360 may determine the memory array 370 is associated with a second condition (e.g., corresponding to a lower level of integrity of the data stored at the memory array 370). Additionally, if the error metric is greater than the second threshold, the controller 360 may determine the memory array 370 is associated with a third condition.

In a first case, the error metric may correspond to the quantity of errors detected within the memory array 370, or as a function (e.g., average, running average, weighted average) of one or more quantities of errors (e.g., over multiple scrub operations).

In a second case, the error condition may correspond to a change in the quantity of detected errors. Here, the memory array 370 may receive an indication of the quantity of detected errors from the error correction circuitry 320 and compare the quantity of detected errors to a quantity of detected errors detected during a previous scrub operation. For example, the controller 360 may store the quantity of detected errors during each scrub operation in a register of the registers 325. The controller 360 may then compare the quantity of errors detected in a recent scrub operation to a quantity stored within the register of the registers 325 (e.g., corresponding to the quantity of detected errors within a previous scrub operation). Based on the difference between the quantity of detected errors in the recent scrub operation and the previous scrub operation, the controller 360 may determine the condition of the memory array 370. For example, the controller 360 may compare the difference to one or more thresholds corresponding to one or more conditions of the memory array 370.

In a third case, the controller 360 may determine the condition of the memory array 370 by comparing a current rate of change of the quantity of detected errors to a previous rate of change of the quantity of detected errors. Here, the controller 360 may determine a rate of change of the detected errors over a first (e.g., previous) period and store an indication of the determined rate of change. For example, the controller 360 may store the indication of the determined rate of change in one of the registers 325. Based on the indicated quantity of errors detected during a recent scrub operation and previous quantities of detected errors (e.g., stored at one or more of the registers 325), the controller 360 may determine a recent rate of change of the quantity of detected errors over a recent period. The controller 360 may determine the condition of the memory array 370 by comparing the difference in the rates of change of the detected errors to one or more thresholds.

The memory device 310 may transmit an indicator of the condition of the memory array 370 to the host device 305 (e.g., by the condition indicator channel 392). In some cases, the condition indicator channel 392 may be dedicated for the condition indication. Additionally or alternatively, the memory device 310 may output an indicator of the condition of the memory array 370 to a register (e.g., one of registers 325) that may be polled by the host device 305.

The memory device 310 may perform scrub operations based on scrub commands. Each scrub command may be associated with one or more rows of the memory array 370 to scrub. In a first case, the memory device 310 may receive the one or more scrub commands by the CA channel 386 from the host device. In a second case, the memory device 310 may generate each of the scrub commands. Here, the controller 360 may generate the scrub commands internally.

The rate of performing the scrub operations may be dependent on the rate of receiving scrub commands. In a first case, the rate of performing scrub operations may be based on a rate of the scrub commands (e.g., a higher rate for generating or receiving scrub commands may correspond to a higher rate for performing scrub operations). Additionally, the rate of performing the scrub operations may be based on a quantity of rows associated with each scrub command (e.g., a greater quantity of rows of the memory array 370 performed as a result of each scrub command may correspond to a higher rate for performing scrub operations). In either case, the rate of performing the scrub operations may be based on the condition of the memory array 370. That is, if the controller 360 determines the condition of the memory array 370 corresponds to relatively high data integrity, the rate of performing scrub operations may be lower than if the controller 360 determines that the condition of the memory array 370 corresponds to lower data integrity.

The memory device 310 may initially perform scrub operations according to a nominal rate. The nominal rate may be a defined rate (e.g., predefined, configured by the host device 305) for performing scrub operations. That is, upon bootup, the system 300 may perform scrub operations according to the nominal rate (e.g., prior to determining the condition of the memory array 370). In some cases, the nominal rate may be based on operating conditions of the system 300. For example, there may be different nominal rates defined for various temperatures of the memory device 310. That is, in extreme operating temperatures (e.g., temperatures exceeding 95° C.), the nominal rate may be higher than in a case that the memory device is near room temperature. Additionally or alternatively, the nominal rate may be based on a voltage associated with the memory array 370.

As the controller 360 determines (and indicates to the host device 305) different conditions of the memory array 370, the rate for performing scrub operations may change. In the case that the memory device 310 receives scrub commands from the host device 305, the host device 305 may communicate scrub commands at a higher rate (e.g., compared to the nominal rate) as the indicated condition of the memory array 370 worsens. Additionally or alternatively, each scrub command may be associated with scrubbing a greater quantity of rows of the memory array 370. In the case that the memory device 310 generates scrub commands, the controller 360 may generate scrub commands (and execute scrub commands) at a higher rate as the determined condition of the memory array 370 worsens. Additionally or alternatively, the memory device 310 may scrub a greater quantity of rows of the memory array 370 for each scrub command as the determined condition of the memory array 370 worsens.

If the controller determines and indicates a first condition of the memory array 370 (e.g., corresponding to a relatively high level of data integrity), the rate for performing scrub operations may correspond to the nominal rate. However, as the condition of the memory array 370 worsens, the memory device 310 may perform scrub operations at a higher rate (e.g., two (2) times, three (3) times, four (4) times, the nominal rate). Thus, as the condition of the memory array 370 deteriorates, the memory device 310 may perform scrub operations at a higher rate. This may improve the reliability of the memory device 310.

Figure 4:
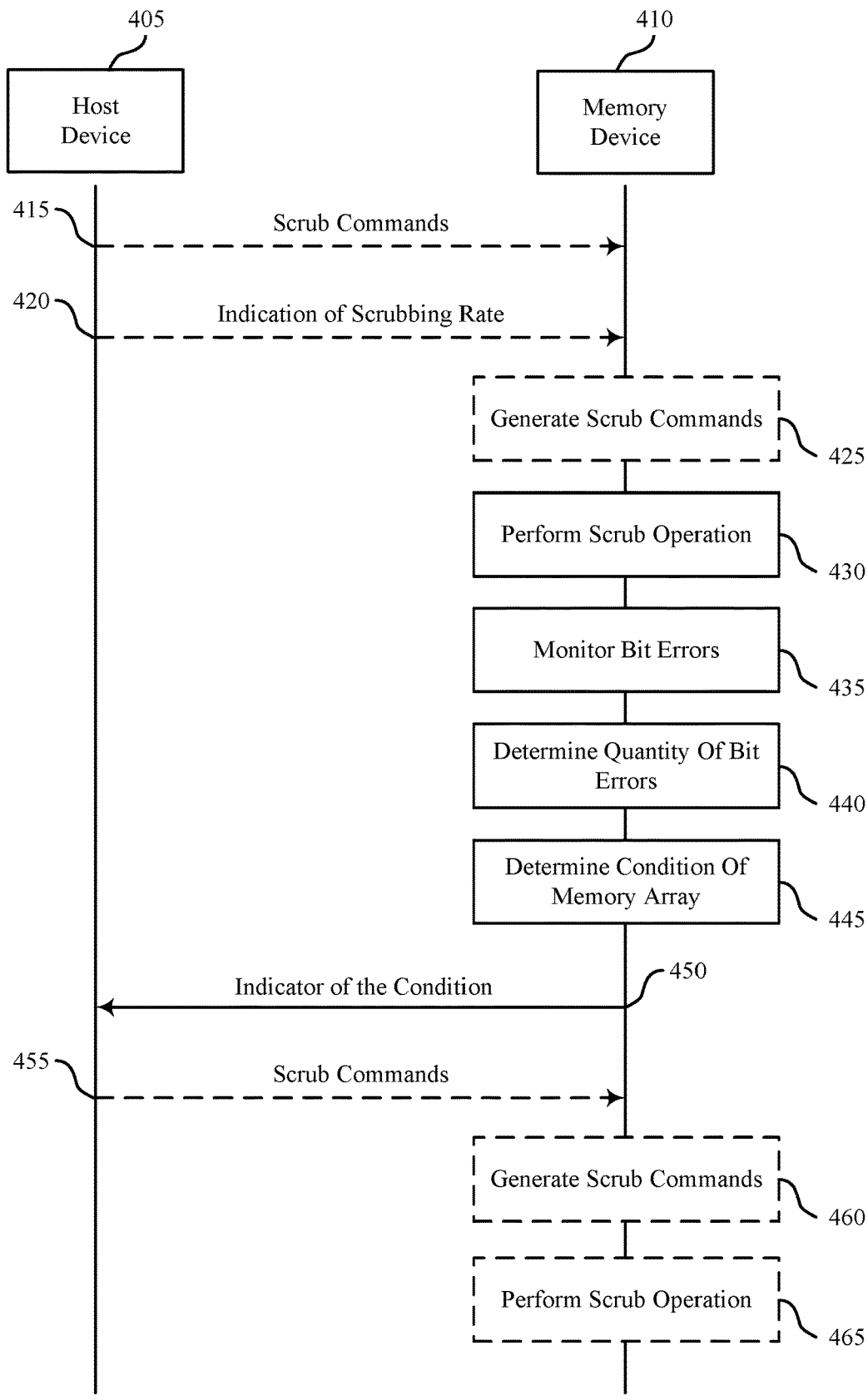
FIGS. 4 and 5 illustrates examples of process flows that support scrub rate control for a memory device in accordance with examples as disclosed herein.

FIG. 4 illustrates an example of a process flow 400 that supports scrub rate control for a memory device in accordance with examples as disclosed herein. The process flow 400 may implement aspects of the systems 100 and 300 and memory die 200 described with reference to FIGS. 1 through 3. The process flow 400 may include operations performed by a host device 405, which may be an example of host device 305 as described with reference to FIG. 3. Host device 405 may implement aspects of the external memory controller 105 as described with reference to FIG. 1. The process flow 400 may further include operations performed by a memory device 410, which may be an example of the memory device 110, the memory array 170, or the memory die 200, or the memory device 310 as described with reference to FIGS. 1 through 3.

At 415, the memory device 410 may optionally receive, from the host device 405, a first plurality of scrub commands according to a first rate for scrubbing the memory array. Here, the memory device 410 may perform scrub operations based on receiving scrub commands from the host device. In some examples, each of the plurality of scrub commands may be associated with (e.g., according to a row counter) one or more of the plurality of rows of the memory array. In some cases, the first rate may be based on a voltage, or a temperature, or both associated with the memory array.

At 420, the memory device 410 may optionally receive, from the host device 405, an indication of a first rate for scrubbing the memory array, the first rate associated with a first condition of the memory array. The condition of the memory array may be associated with an integrity of data stored at the memory array.

At 425, the memory device 410 may optionally generate a first plurality of scrub commands for scrubbing the memory array according to a first rate based on the first condition. For example, the memory device 410 may generate the first plurality of scrub commands in a case where the memory device 410 does not receive scrub commands from the host device 405.

At 430, the memory device 410 may perform a scrub operation. The scrub operation may include the memory device 410 reading data and error correction information stored in each row of a plurality of rows of a memory array of the memory device 410 and detecting bit errors in the data of each row based at least on the error correction information. The memory device 410 may further correct bit errors in the data of each row based on detecting bit errors in the data of each row. In some cases, performing the scrub operation may be based on receiving the first plurality of scrub commands (e.g., at 415). In some other cases, performing the scrub operation may be based on generating the first plurality of scrub commands (e.g., at 425). In some cases (e.g., when the host device 405 transmits an indication of the first rate), performing the scrub operation is based on receiving the indication of the first rate for scrubbing the memory array. The indication of the first rate may be, for example, a quantity of rows to scrub for each scrub command received from the host device 405, or, if the memory device 410 generates the scrub commands, a rate for generating scrub commands or quantity of rows to scrub for each scrub command. The memory device 410 may further receive, from the host device 405, refresh commands according to a refresh rate of the memory device 410 and perform the scrub operation based on performing the refresh operations. For example, the memory device 410 may perform the scrub operation as a part of refresh commands. In some examples, refresh may be performed at a higher rate than the scrub operations. For example, refresh may be performed using an interval of 64 ms (each row should be refreshed every 64 ms), while scrub operations may be performed at a lower rate. In some examples, where scrub operations are performed as part of refresh, the scrub operations may be performed on some fraction of the refresh commands. For example, for a scrub rate of 1 second (scrub of each row at least once per 1 second interval) and a refresh rate of 64 ms, the memory device 410 may perform scrub operations on 1/16 of the refresh commands (e.g., performing scrub operations over 1/16 of the rows for each refresh cycle).

Additionally or alternatively, the memory device 410 may receive a plurality of scrub commands over a period of time (e.g., corresponding to the scrub rate) interspersed with access commands. When the memory device 410 receives an access command (e.g., read command), the memory device 410 may also perform a scrub operation on the accessed row(s) (e.g., write back of corrected data) as part of the read command, and may mark the row(s) as being scrubbed, and may thus skip the accessed rows when cycling through rows as part of the scrub commands. In addition, rows that are written may also be skipped when cycling through rows as part of the scrub commands. That is, a full scrub operation (scrub of all rows) may be performed based on a combination of scrub commands and access commands (e.g., read commands, write commands). In some cases, an order of rows or sets of rows for the scrub operation may be updated based on row accesses during the period of time for the scrub operation to reflect an order of rows or sets of rows for a combination of access commands and scrub commands. Thus, a next scrub operation may follow a similar modified order, which may ensure that each row is scrubbed or accessed according to the scrub rate.

The memory device 410 may store error correction information for the plurality of rows of the memory array (e.g., when receiving a write command). Performing the scrub operation may include the memory device 410 comparing the stored error correction information with error correction information generated from the stored data. When the memory device 410 performs the scrub operation, the memory device 410 may perform, for each of the plurality of scrub commands, an error correction operation for the one or more of the plurality of rows to generate second data based on the data read from the memory array and the error correction information. The memory device 410 may further write, for the each of the plurality of scrub commands, the second data to the one or more of the plurality of rows of the memory array. Here, the memory device 410 may perform the reading and the correcting of the bit errors for a first quantity of the plurality of rows of the memory array for each of the plurality of scrub commands.

At 435, the memory device 410 may monitor, during the scrub operation, the bit errors detected for the plurality of rows of the scrub operation. For example, the memory device 410 may count a quantity of errors detected and/or corrected for each row.

At 440, the memory device 410 may determine a quantity of the bit errors detected during the scrub operation (e.g., sum of the quantity of errors detected and/or corrected for each row) based on the monitoring.

At 445, the memory device 410 may determine, based on the quantity of the bit errors detected, a condition of the memory array. In some cases, the memory device 410 may determine the condition of the memory array by comparing the quantity of the bit errors detected to one or more thresholds. Additionally or alternatively, the memory device 410 may determine the condition of the memory array by determining a difference between the quantity of the bit errors detected during the scrub operation and a second quantity of bit errors detected during a second scrub operation performed before the scrub operation.

In some other cases, the memory device 410 may determine the condition of the memory array by determining a rate of change of the quantity of detected errors. For example, the memory device 410 may determine a first difference between the quantity of the bit errors detected during the scrub operation and a second quantity of bit errors detected during a second scrub operation performed before the scrub operation. The memory device 410 may further determine a second difference between respective quantities of bit errors detected during scrub operations including at least one scrub operation performed before the second scrub operation. Here, the memory device 410 may determine the condition of the memory array based on determining a change between the first difference and the second difference.

In some examples, the memory device 410 determines the condition of the memory array based on determining that the condition of the memory array has changed from a first condition to a second condition associated with a lower integrity of data stored at the memory array than the first condition.

The memory device 410 may perform an action associated with the determined condition of the memory array. For example, performing the action may include the memory device 410 adjusting the rate for performing scrub operations. In one case, the memory device 410 may increase a frequency of executing a scrub command. In another case, the memory device 410 may increase a number of rows scrubbed during an execution of a scrub command.

In some cases, performing the action may include transmitting the indicator of the condition of the memory array. For example, the memory device 410 may transmit, to the host device 405, an indicator of the condition of the memory array at 450.

At 455, the memory device 410 may optionally receive, from the host device 405, a second plurality of scrub commands. In some cases, the memory device 410 may receive the second plurality of scrub commands according to a second rate for scrubbing the memory array that is greater than the first rate. That is, the memory device 410 may receive the second plurality of scrub commands from the host device 405 in a case that the memory device 410 performs scrub operations based on scrub commands received from the host device. In some cases, the second rate may be based on the current condition of the memory array (e.g., as determined at 445). The memory device 410 may receive the second plurality of scrub commands after receiving the first plurality of scrub commands.

Additionally or alternatively, at 460 the memory device 410 may optionally generate a second plurality of scrub commands for scrubbing the memory array according to a second rate that is greater than the first rate. That is, the memory device 410 may generate the second plurality of scrub commands in a case that the memory device 410 performs scrub operations based on scrub commands generated at the memory device 410. In some cases, the second rate may be based on the current condition of the memory array (e.g., as determined at 445). In some cases, the memory device 410 may generate the second plurality of scrub commands after transmitting the indicator of the condition of the memory array. In some other cases, the memory device 410 may generate the second plurality of scrub commands based on performing the action associated with the condition of the memory array. In some cases, the memory device 410 may determine the second rate for scrubbing the memory array based on determining that the condition of the memory array has changed from the first condition to the second condition.

At 465, the memory device 410 may optionally perform a second scrub operation according to the second rate for scrubbing the memory array (e.g., after either receiving the scrub commands at 455 or generating the scrub commands at 460). In some cases, performing the second scrub operation may include the memory device 410 reading the data and the error correction information stored in each row of the plurality of rows of the memory array and correcting bit errors in the data of each row based on the error correction information. Here, performing the second scrub operation may further include the memory device 410 performing the reading and the correcting of the bit errors for a second quantity of the plurality of rows of the memory array for each of the second plurality of scrub commands. The second quantity of the plurality of rows may be greater than the first quantity of the plurality of rows.

Figure 5:
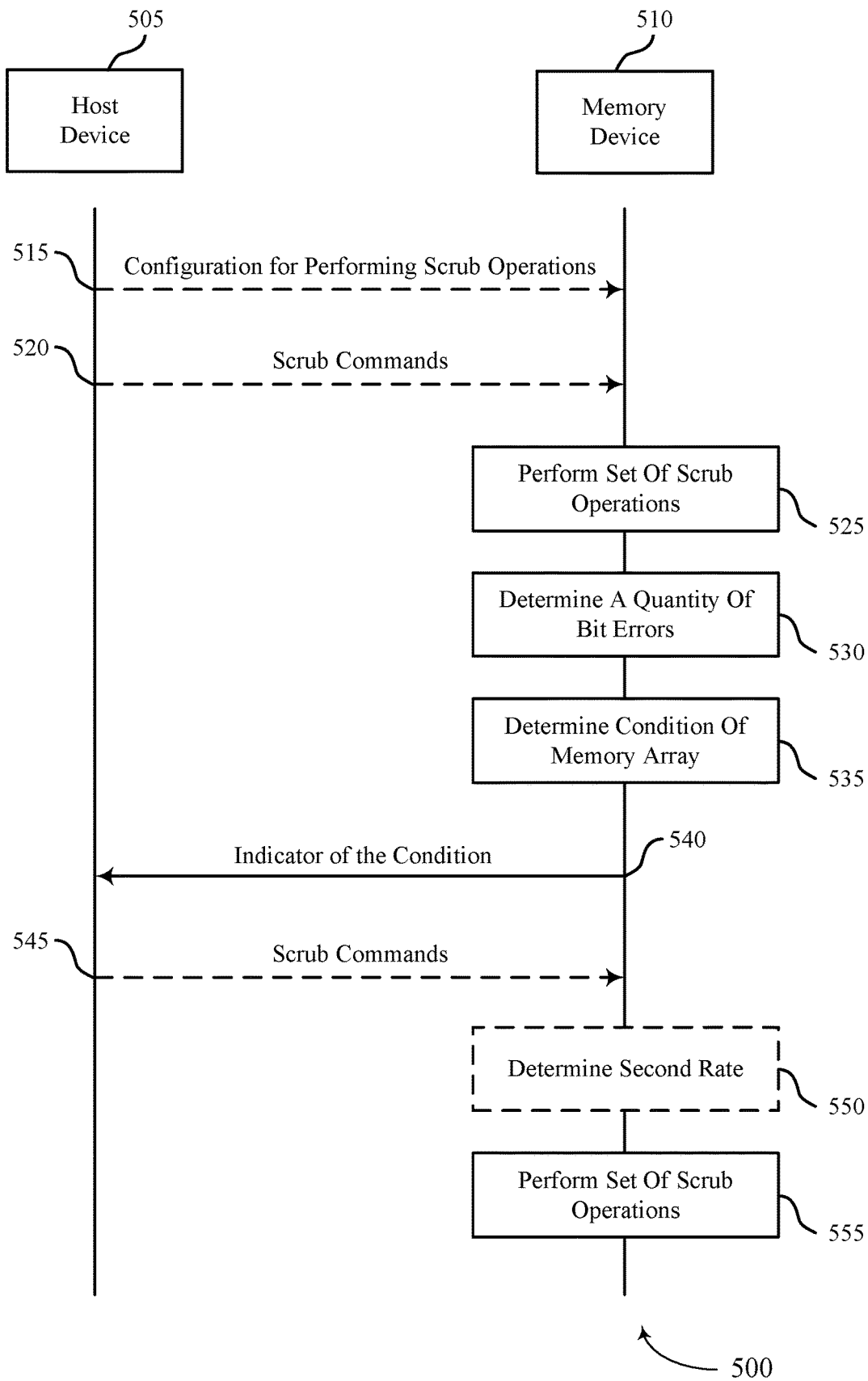

FIG. 5 illustrates an example of a process flow 500 that supports scrub rate control for a memory device in accordance with examples as disclosed herein. The process flow 500 may implement aspects of the systems 100 and 300 and memory die 200 described with reference to FIGS. 1 through 3. The process flow 500 may include operations performed by a host device 505, which may be an example of host device 305 as described with reference to FIG. 3. Host device 505 may implement aspects of the external memory controller 105 as described with reference to FIG. 1. The process flow 500 may further include operations performed by a memory device 510, which may be an example of the memory device 110, the memory array 170, or the memory die 200, or the memory device 310 as described with reference to FIGS. 1 through 3.

At 515, the memory device 510 may optionally receive, from the host device 505, a configuration for performing scrub operations, the configuration indicating the first rate for scrubbing the memory array. The indication of the first rate may be, for example, a quantity of rows to scrub for each scrub command received from the host device 505, or, if the memory device 510 generates the scrub commands, a rate for generating scrub commands or quantity of rows to scrub for each scrub command.

At 520, the memory device 510 may optionally receive, from the host device 505, a first plurality of scrub commands from a host device according to the first rate for scrubbing the memory array. In some other cases, the memory device 510 may generate the first plurality of scrub commands (e.g., based on the configuration information). In either case, each of the scrub commands may be associated with (e.g., according to a row counter) a portion of the data stored in the memory array.

At 525, the memory device 510 may perform a first set of scrub operations. The scrub operations may include the memory device 510 detecting or correcting bit errors in a memory array of the memory device 510 according to a first rate for scrubbing the memory array associated with a first condition of the memory array. In some cases, the memory device 510 may perform the first set of scrub operations based on receiving the first plurality of scrub commands (e.g., in a case that the memory device 510 received the first plurality of scrub commands from the host device 505 at 515).

When performing the scrub operations, the memory device 510 may read, for each of the portions of data (e.g., indicated by each of the scrub commands), first data and error correction information from the memory array. The memory device 510 may further perform, for the each of the portions of data, an error correction operation on the first data read from the memory array to generate second data, where performing the error correction operation is based on the error correction information. The memory device 510 may write, for the each of the portions of data, the second data to the memory array, where performing each of the first set of scrub operations is based on the writing.

At 530, the memory device 510 may determine a quantity of the bit errors detected during each scrub operation of the first set of scrub operations.

At 535, the memory device 510 may determine, based on the quantities of the bit errors detected, a second condition of the memory array associated with a second rate for scrubbing the memory array. The second condition of the memory array may correspond to lower integrity of data being stored at the memory array than the first condition of the memory array. Further, the second rate for scrubbing the memory array may be greater than the first rate for scrubbing the memory array.

The memory device 510 may determine the second condition of the memory array based on comparing the quantity of the bit errors detected during one of the first set of scrub operations to one or more thresholds. Additionally or alternatively, the memory device 510 may determine the second condition of the memory array based on determining a difference between respective quantities of the bit errors detected during a first scrub operation and a second scrub operation of the first set of scrub operations. In some other examples, the memory device 510 may determine a first difference between respective quantities of the bit errors detected during a first subset of the first set of scrub operations. The memory device 510 may further determine a second difference between respective quantities of the bit errors detected during a second subset of the first set of scrub operations including at least one scrub operation performed after the first subset of the first set of scrub operations. Here, the memory device 510 may determine the second condition of the memory array based on determining a change between the first difference and the second difference.

At 540, the memory device 510 may transmit, to the host device 505, an indicator of the second condition of the memory array.

At 545, the memory device 510 may receive, from the host device 505, a second plurality of scrub commands from the host device according to the second rate for scrubbing the memory array.

At 550, the memory device 510 may optionally determine a second rate for scrubbing the memory array based on determining the second condition of the memory array (e.g., at 535). In this case, the memory device 510 may generate the second plurality of scrub commands.

At 555, the memory device 510 may perform a second set of scrub operations comprising detecting bit errors in the memory array according to the second rate for scrubbing the memory array. In some cases, the memory device 510 may perform the second set of scrub operations based on receiving the second plurality of scrub commands (e.g., in a case that the memory device 510 received the second plurality of scrub commands from the host device 505 at 545). Additionally or alternatively, the memory device 510 may perform the second set of scrub operations based on determining the second rate for scrubbing the memory array.

Figure 6:
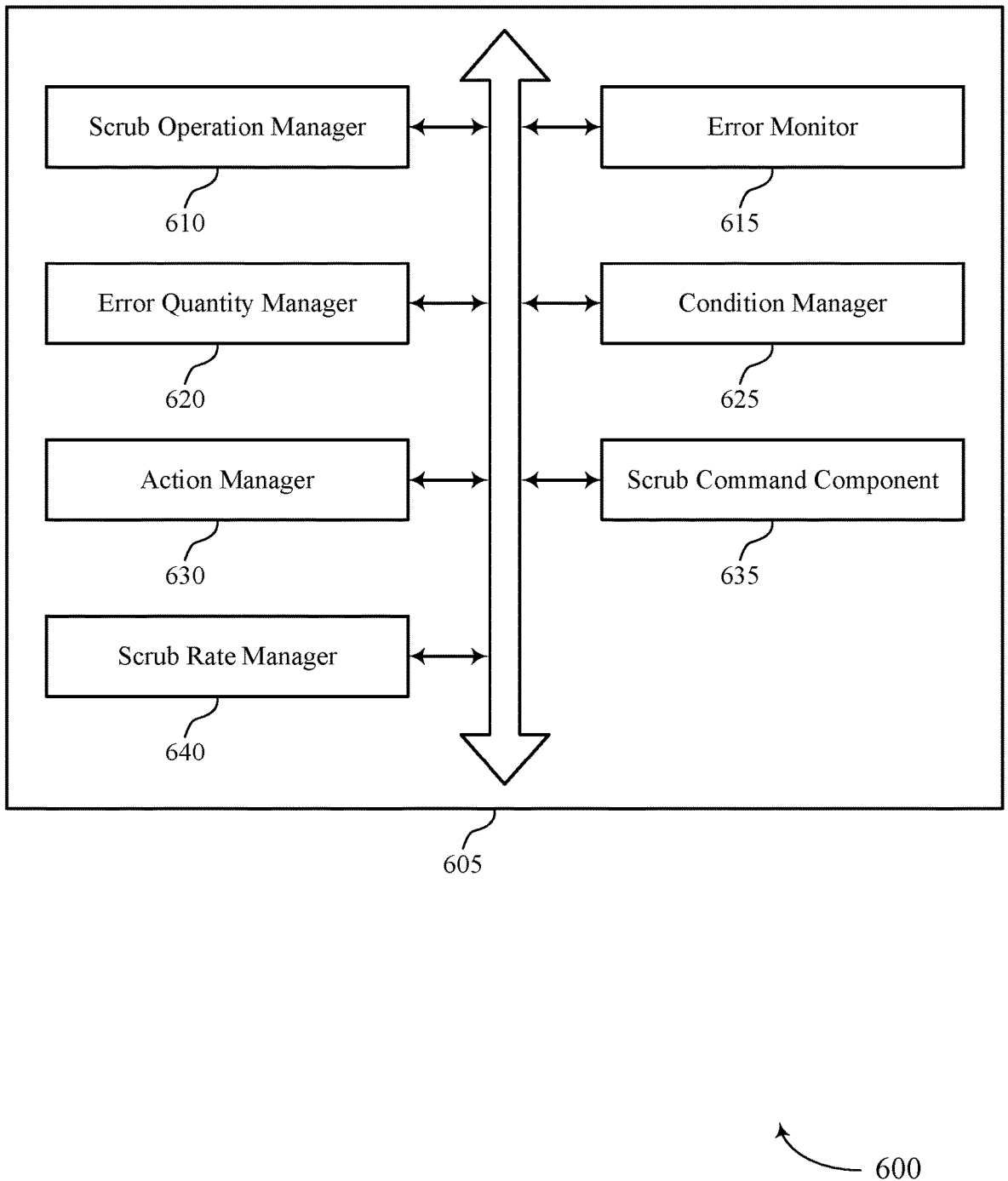
FIG. 6 shows a block diagram of a memory device that supports scrub rate control for a memory device in accordance with examples as disclosed herein.

FIG. 6 shows a block diagram 600 of a memory device 605 that supports scrub rate control for a memory device in accordance with examples as disclosed herein. The memory device 605 may be an example of aspects of a memory device as described with reference to FIGS. 1 and 3 through 5. The memory device 605 may include a scrub operation manager 610, an error monitor 615, an error quantity manager 620, a condition manager 625, an action manager 630, a scrub command component 635, and a scrub rate manager 640. Each of these modules may communicate, directly or indirectly, with one another (e.g., via one or more buses).

The scrub operation manager 610 may perform, at a memory device, a scrub operation including reading data and error correction information stored in each row of a set of rows of a memory array of the memory device and detecting bit errors in the data of each row based on the error correction information. In some cases, the scrub operation manager 610 may correct bit errors in the data of each row based on detecting bit errors in the data of each row. In some examples, the scrub operation manager 610 may receive, from the host device, a set of commands for accessing the memory array. The scrub operation manager 610 may perform operations indicated by the set of commands for accessing the memory array, where performing the scrub operation is based on performing the operations. In some cases, the scrub operation manager 610 may perform, for each of the set of scrub commands, an error correction operation on the data read from the memory array for the one or more of the set of rows to generate second data based on the error correction information. In some instances, the scrub operation manager 610 may write, for the each of the set of scrub commands, the second data to the one or more of the set of rows of the memory array. In some cases, performing the scrub operation further includes the scrub operation manager 610 comparing the data and the error correction information stored in each row of the set of rows of the memory array. The error correction information may be for the plurality of rows of the memory array and stored at the memory device.

In some examples, the scrub operation manager 610 may perform a second scrub operation according to a second rate for scrubbing the memory array. In some cases, performing a second scrub operation may include the scrub operation manager 610 reading the data and the error correction information stored in each row of the set of rows of the memory array and correcting bit errors in the data of each row based on the error correction information. Here, performing the second scrub operation may include the scrub operation manager 610 performing the reading and the correcting of the bit errors for a second quantity of the set of rows of the memory array for each of the second set of scrub commands, and where the second quantity of the set of rows is greater than the first quantity of the set of rows.

The error monitor 615 may monitor, during the scrub operation, the bit errors detected for the set of rows of the scrub operation.

The error quantity manager 620 may determine a quantity of the bit errors detected during the scrub operation based on the monitoring.

The condition manager 625 may determine, based on the quantity of the bit errors detected, a condition of the memory array. In some cases, the condition of the memory array indicates an integrity of data stored at the memory array. In some examples, the condition manager 625 may compare the quantity of the bit errors detected to one or more thresholds, where determining the condition of the memory array is based on the comparing. In some cases, the condition manager 625 may determine a difference between the quantity of the bit errors detected during the scrub operation and a second quantity of bit errors detected during a second scrub operation performed before the scrub operation, where determining the condition of the memory array is based on the difference.

In some instances, the condition manager 625 may determine a first difference between the quantity of the bit errors detected during the scrub operation and a second quantity of bit errors detected during a second scrub operation performed before the scrub operation. The condition manager 625 may determine a second difference between respective quantities of bit errors detected during scrub operations including at least one scrub operation performed before the second scrub operation. In some examples, the condition manager 625 may determine a change between the first difference and the second difference, where determining the condition of the memory array is based on the change.

In some examples, the condition manager 625 may determine that the condition of the memory array has changed from a first condition to a second condition associated with a lower integrity of data stored at the memory array than the first condition, where determining the condition of the memory array is based on the determining that the condition of the memory array has changed.

The action manager 630 may perform, by the memory device, an action associated with the condition of the memory array. In some cases, performing the action associated with the condition of the memory array may include transmitting, from the memory device to a host device, an indicator of the condition of the memory array.

The scrub command component 635 may receive, from the host device, a first set of scrub commands according to a first rate for scrubbing the memory array, where performing the scrub operation is based on receiving the first set of scrub commands. In some cases, the first rate is based on a voltage, or a temperature, or both associated with the memory array.

In some examples, the scrub command component 635 may receive a second set of scrub commands according to a second rate for scrubbing the memory array that is greater than the first rate. In some cases, the second rate is based on the second condition of the memory array. In some examples, the scrub command component 635 may receive, from the host device, the second set of scrub commands after receiving the first set of scrub commands.

Additionally or alternatively, the scrub command component 635 may generate, by the memory device, a first set of scrub commands for scrubbing the memory array according to a first rate based on the first condition, where performing the scrub operation is based on generating the first set of scrub commands. In some examples, the scrub command component 635 may generate, by the memory device based on performing the action associated with the condition of the memory array, a second set of scrub commands for scrubbing the memory array according to a second rate that is greater than the first rate.

The scrub rate manager 640 may receive, from the host device, an indication of a first rate for scrubbing the memory array, the first rate associated with the first condition, where performing the scrub operation is based on receiving the indication of the first rate for scrubbing the memory array. In some examples, the scrub rate manager 640 may determine, at the memory device, a second rate for scrubbing the memory array based on determining that the condition of the memory array has changed from the first condition to the second condition.

The scrub operation manager 610 may perform, at a memory device, a first set of scrub operations including detecting or correcting bit errors in a memory array of the memory device according to a first rate for scrubbing the memory array associated with a first condition of the memory array. In some examples, the scrub operation manager 610 may perform a second set of scrub operations including detecting or correcting bit errors in the memory array according to a second rate for scrubbing the memory array. In some cases, the second rate for scrubbing the memory array is greater than the first rate for scrubbing the memory array. In some instances, the second rate for scrubbing the memory array is greater than the first rate based on performing the action associated with the condition of the memory array.

The scrub operation manager 610 may read, for each of the portions of data, first data and error correction information from the memory array. In some cases, the scrub operation manager 610 may perform, for the each of the portions of data, an error correction operation on the first data read from the memory array to generate second data, where performing the error correction operation is based on the error correction information. In some instances, the scrub operation manager 610 may write, for the each of the portions of data, the second data to the memory array, where performing each of the first set of scrub operations is based on the writing.

The error quantity manager 620 may determine a quantity of the bit errors detected during each scrub operation of the first set of scrub operations.

The condition manager 625 may determine, based on one or more of the quantities of the bit errors detected, a second condition of the memory array associated with a second rate for scrubbing the memory array. In some cases, the second condition of the memory array corresponds to lower integrity of data being stored at the memory array than the first condition of the memory array. In some examples, the condition manager 625 may compare the quantity of the bit errors detected during one of the first set of scrub operations to one or more thresholds, where determining the second condition of the memory array is based on the comparing. In some cases, the condition manager 625 may determine a difference between respective quantities of the bit errors detected during a first scrub operation and a second scrub operation of the first set of scrub operations, where determining the second condition of the memory array is based on the difference.

In some instances, the condition manager 625 may determine a first difference between respective quantities of the bit errors detected during a first subset of the first set of scrub operations. The condition manager 625 may determine a second difference between respective quantities of the bit errors detected during a second subset of the first set of scrub operations including at least one scrub operation performed after the first subset of the first set of scrub operations. In some examples, the condition manager 625 may determine a change between the first difference and the second difference, where determining the second condition of the memory array is based on the change.

The action manager 630 may transmit, to a host device, an indicator of the second condition of the memory array.

The scrub command component 635 may receive, from the host device, a set of scrub commands that each correspond to one or more of the set of rows of the memory array.

In some examples, the scrub command component 635 may receive, from a host device, a set of scrub commands that each correspond to a portion of data stored in the memory array. In some examples, the scrub command component 635 may receive a first set of scrub commands from a host device according to the first rate for scrubbing the memory array, where performing the first set of scrub operations according to the first rate is based on the receiving the first set of scrub commands.

In some examples, the scrub command component 635 may receive a second set of scrub commands from the host device according to the second rate for scrubbing the memory array, where performing the second set of scrub operations according to the second rate is based on receiving the second set of scrub commands.

The scrub rate manager 640 may receive, prior to performing the first set of scrub operations, a configuration for performing scrub operations, the configuration indicating the first rate for scrubbing the memory array. In some examples, the scrub rate manager 640 may determine the second rate for scrubbing the memory array based on determining the second condition of the memory array, where performing the second set of scrub operations is based on determining the second rate for scrubbing the memory array.

Figure 7:
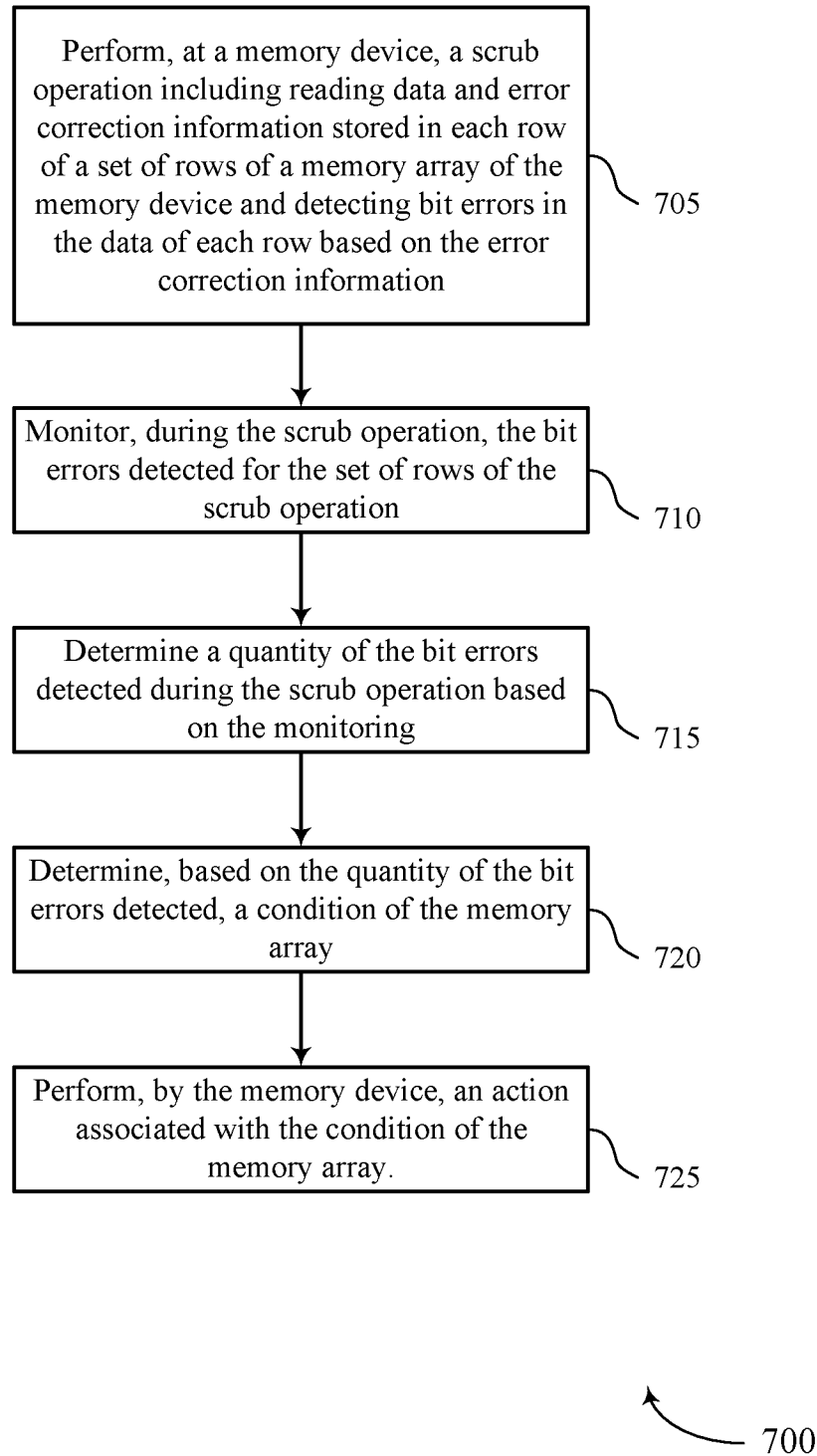
FIGS. 7 through 11 show flowcharts illustrating a method or methods that support scrub rate control for a memory device in accordance with examples as disclosed herein.

FIG. 7 shows a flowchart illustrating a method or methods 700 that supports scrub rate control for a memory device in accordance with examples as disclosed herein. The operations of method 700 may be implemented by a memory device or its components as described herein. For example, the operations of method 700 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 705, the memory device may perform, at a memory device, a scrub operation including reading data and error correction information stored in each row of a set of rows of a memory array of the memory device and detecting bit errors in the data of each row based on the error correction information. The operations of 705 may be performed according to the methods described herein. In some examples, aspects of the operations of 705 may be performed by a scrub operation manager as described with reference to FIG. 6.

At 710, the memory device may monitor, during the scrub operation, the bit errors detected for the set of rows of the scrub operation. The operations of 710 may be performed according to the methods described herein. In some examples, aspects of the operations of 710 may be performed by an error monitor as described with reference to FIG. 6.

At 715, the memory device may determine a quantity of the bit errors detected during the scrub operation based on the monitoring. The operations of 715 may be performed according to the methods described herein. In some examples, aspects of the operations of 715 may be performed by an error quantity manager as described with reference to FIG. 6.

At 720, the memory device may determine, based on the quantity of the bit errors detected, a condition of the memory array. The operations of 720 may be performed according to the methods described herein. In some examples, aspects of the operations of 720 may be performed by a condition manager as described with reference to FIG. 6.

At 725, the memory device may perform an action associated with the condition of the memory array. For example, the memory device may transmit, from the memory device to a host device, an indicator of the condition of the memory array. In another example, the memory device may increase a number of rows to be scrubbed during an execution of a scrub command. In another example, the memory device may increase a rate for scrubbing the memory array. The operations of 725 may be performed according to the methods described herein. In some examples, aspects of the operations of 725 may be performed by an indicator transmitter as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for performing, at a memory device, a scrub operation including reading data and error correction information stored in each row of a set of rows of a memory array of the memory device and detecting bit errors in the data of each row based on the error correction information, monitoring, during the scrub operation, the bit errors detected for the set of rows of the scrub operation, determining a quantity of the bit errors detected during the scrub operation based on the monitoring, determining, based on the quantity of the bit errors detected, a condition of the memory array, and performing, by the memory device, an action associated with the condition of the memory array.

Some examples of the method 700 and the apparatus described herein may further include operations, features, means, or instructions for comparing the quantity of the bit errors detected to one or more thresholds, where determining the condition of the memory array may be based on the comparing.

Some cases of the method 700 and the apparatus described herein may further include operations, features, means, or instructions for determining a difference between the quantity of the bit errors detected during the scrub operation and a second quantity of bit errors detected during a second scrub operation performed before the scrub operation, where determining the condition of the memory array may be based on the difference.

Some instances of the method 700 and the apparatus described herein may further include operations, features, means, or instructions for determining a first difference between the quantity of the bit errors detected during the scrub operation and a second quantity of bit errors detected during a second scrub operation performed before the scrub operation, determining a second difference between respective quantities of bit errors detected during scrub operations including at least one scrub operation performed before the second scrub operation, and determining a change between the first difference and the second difference, where determining the condition of the memory array may be based on the change.

Some examples of the method 700 and the apparatus described herein may further include operations, features, means, or instructions for storing the error correction information for the set of rows of the memory array of the memory device, where performing the scrub operation further includes comparing the data and the error correction information stored in each row of the plurality of rows of the memory array.

In some examples of the method 700, performing the action includes transmitting, from the memory device to a host device, an indicator of the condition of the memory array.

Some instances of the method 700 and the apparatus described herein may further include operations, features, means, or instructions for receiving, from the host device, a first set of scrub commands according to a first rate for scrubbing the memory array, where performing the scrub operation may be based on receiving the first set of scrub commands, and receiving, from the host device after transmitting the indicator of the condition of the memory array to the host device, a second set of scrub commands according to a second rate for scrubbing the memory array that may be greater than the first rate.

Some cases of the method 700 and the apparatus described herein may further include operations, features, means, or instructions for determining that the condition of the memory array may have changed from a first condition to a second condition associated with a lower integrity of data stored at the memory array than the first condition, where determining the condition of the memory array may be based on the determining that the condition of the memory array may have changed.

In some examples of the method 700 and the apparatus described herein, the second rate may be based on the second condition of the memory array.

In some cases of the method 700 and the apparatus described herein, the first rate may be based on a voltage, or a temperature, or both associated with the memory array.

Some instances of the method 700 and the apparatus described herein may further include operations, features, means, or instructions for receiving, from the host device, an indication of a first rate for scrubbing the memory array, the first rate associated with the first condition, where performing the scrub operation may be based on receiving the indication of the first rate for scrubbing the memory array, determining, at the memory device, a second rate for scrubbing the memory array based on determining that the condition of the memory array may have changed from the first condition to the second condition, and performing a second scrub operation according to the second rate for scrubbing the memory array.

Some examples of the method 700 and the apparatus described herein may further include operations, features, means, or instructions for generating, by the memory device, a first set of scrub commands for scrubbing the memory array according to a first rate based on the first condition, where performing the scrub operation may be based on generating the first set of scrub commands, and generating, by the memory device based on performing the action associated with the condition of the memory array, a second set of scrub commands for scrubbing the memory array according to a second rate that may be greater than the first rate.

Some cases of the method 700 and the apparatus described herein may further include operations, features, means, or instructions for correcting bit errors in the data of each row based on detecting bit errors in the data of each row.

In some examples of the method 700 and the apparatus described herein, performing the scrub operation may include operations, features, means, or instructions for receiving, from a host device, a set of scrub commands that each correspond to one or more of the set of rows of the memory array, performing, for each of the set of scrub commands, an error correction operation on the data read from the memory array for the one or more of the set of rows to generate second data based on the error correction information, and writing, for the each of the set of scrub commands, the second data to the one or more of the set of rows of the memory array.

In some cases of the method 700 and the apparatus described herein, performing the scrub operation may include operations, features, means, or instructions for receiving, from the host device after receiving the first set of scrub commands, a second set of scrub commands, and performing, based on performing the action associated with the condition of the memory array, a second scrub operation including reading the data and the error correction information stored in each row of the set of rows of the memory array and correcting bit errors in the data of each row based on the error correction information, where performing the second scrub operation may include operations, features, means, or instructions for performing the reading and the correcting of the bit errors for a second quantity of the set of rows of the memory array for each of the second set of scrub commands, and where the second quantity of the set of rows may be greater than the first quantity of the set of rows.

Some instances of the method 700 and the apparatus described herein may further include operations, features, means, or instructions for receiving, from the host device, a set of commands for accessing the memory array, and performing operations indicated by the set of commands for accessing the memory array, where performing the scrub operation may be based on performing the operations.

In some examples of the method 700 and the apparatus described herein, the condition of the memory array indicates an integrity of data stored at the memory array.

Figure 8:
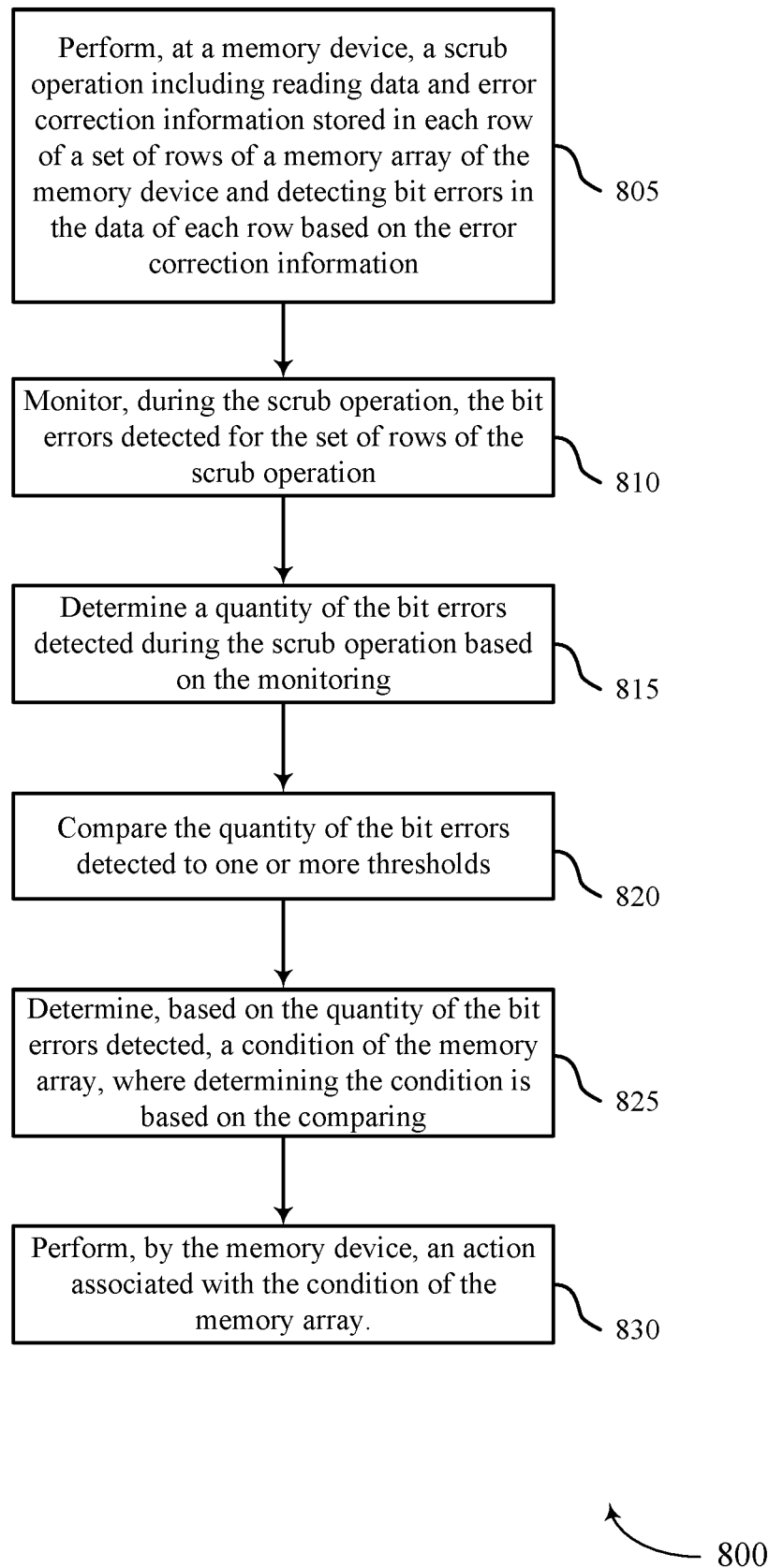

FIG. 8 shows a flowchart illustrating a method or methods 800 that supports scrub rate control for a memory device in accordance with examples as disclosed herein. The operations of method 800 may be implemented by a memory device or its components as described herein. For example, the operations of method 800 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 805, the memory device may perform, at a memory device, a scrub operation including reading data and error correction information stored in each row of a set of rows of a memory array of the memory device and detecting bit errors in the data of each row based on the error correction information. The operations of 805 may be performed according to the methods described herein. In some examples, aspects of the operations of 805 may be performed by a scrub operation manager as described with reference to FIG. 6.

At 810, the memory device may monitor, during the scrub operation, the bit errors detected for the set of rows of the scrub operation. The operations of 810 may be performed according to the methods described herein. In some examples, aspects of the operations of 810 may be performed by an error monitor as described with reference to FIG. 6.

At 815, the memory device may determine a quantity of the bit errors detected during the scrub operation based on the monitoring. The operations of 815 may be performed according to the methods described herein. In some examples, aspects of the operations of 815 may be performed by an error quantity manager as described with reference to FIG. 6.

At 820, the memory device may compare the quantity of the bit errors detected to one or more thresholds. The operations of 820 may be performed according to the methods described herein. In some examples, aspects of the operations of 820 may be performed by a condition manager as described with reference to FIG. 6.

At 825, the memory device may determine, based on the quantity of the bit errors detected, a condition of the memory array, where determining the condition of the memory array is based on the comparing. The operations of 825 may be performed according to the methods described herein. In some examples, aspects of the operations of 825 may be performed by a condition manager as described with reference to FIG. 6.

At 830, the memory device may perform an action associated with the condition of the memory array. For example, the memory device may transmit, from the memory device to a host device, an indicator of the condition of the memory array. In another example, the memory device may increase a number of rows to be scrubbed during an execution of a scrub command. In another example, the memory device may increase a rate for scrubbing the memory array. The operations of 830 may be performed according to the methods described herein. In some examples, aspects of the operations of 830 may be performed by an indicator transmitter as described with reference to FIG. 6.

Figure 9:
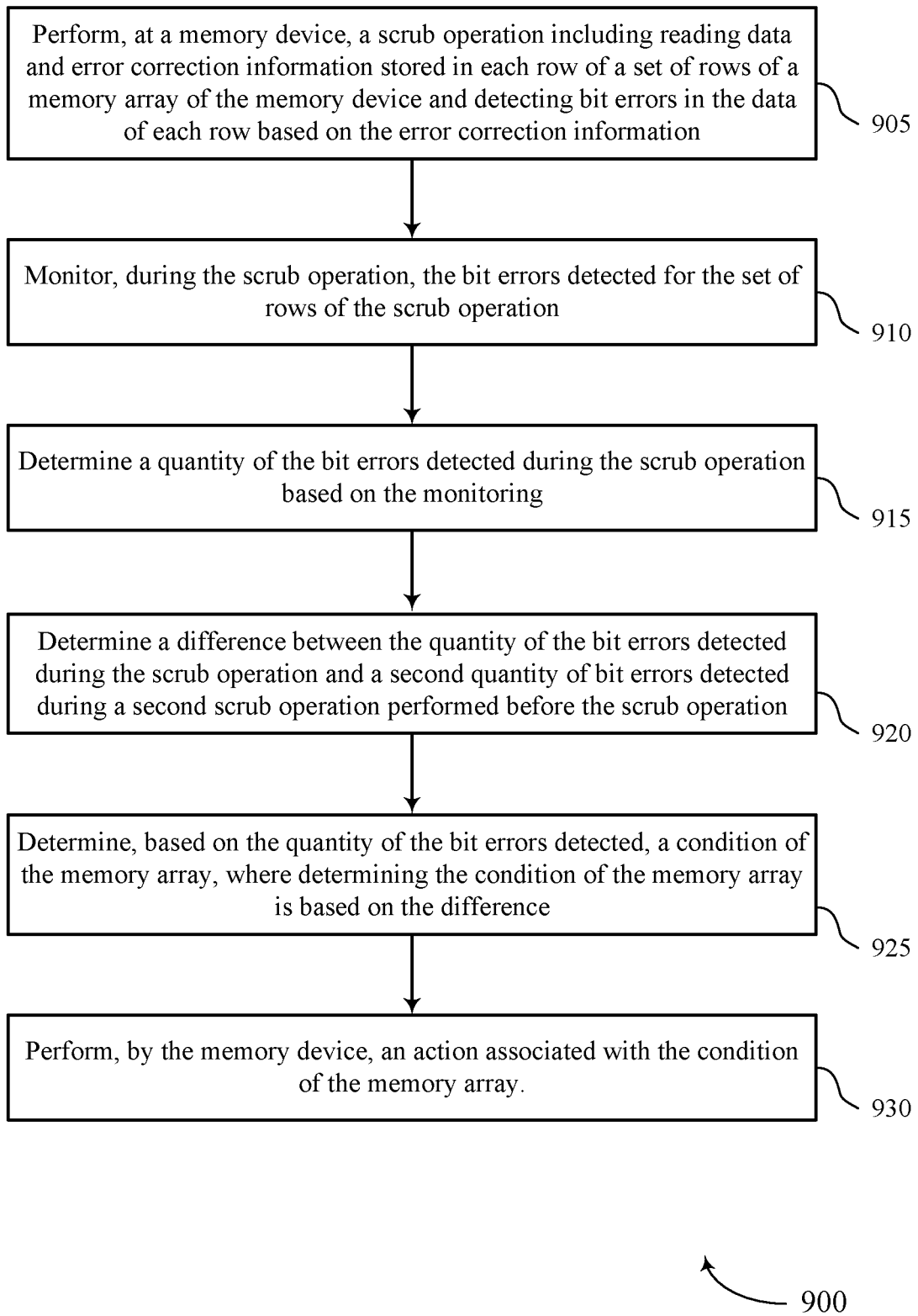

FIG. 9 shows a flowchart illustrating a method or methods 900 that supports scrub rate control for a memory device in accordance with examples as disclosed herein. The operations of method 900 may be implemented by a memory device or its components as described herein. For example, the operations of method 900 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 905, the memory device may perform, at a memory device, a scrub operation including reading data and error correction information stored in each row of a set of rows of a memory array of the memory device and detecting bit errors in the data of each row based on the error correction information. The operations of 905 may be performed according to the methods described herein. In some examples, aspects of the operations of 905 may be performed by a scrub operation manager as described with reference to FIG. 6.

At 910, the memory device may monitor, during the scrub operation, the bit errors detected for the set of rows of the scrub operation. The operations of 910 may be performed according to the methods described herein. In some examples, aspects of the operations of 910 may be performed by an error monitor as described with reference to FIG. 6.

At 915, the memory device may determine a quantity of the bit errors detected during the scrub operation based on the monitoring. The operations of 915 may be performed according to the methods described herein. In some examples, aspects of the operations of 915 may be performed by an error quantity manager as described with reference to FIG. 6.

At 920, the memory device may determine a difference between the quantity of the bit errors detected during the scrub operation and a second quantity of bit errors detected during a second scrub operation performed before the scrub operation. The operations of 920 may be performed according to the methods described herein. In some examples, aspects of the operations of 920 may be performed by a condition manager as described with reference to FIG. 6.

At 925, the memory device may determine, based on the quantity of the bit errors detected, a condition of the memory array, where determining the condition of the memory array is based on the difference. The operations of 925 may be performed according to the methods described herein. In some examples, aspects of the operations of 925 may be performed by a condition manager as described with reference to FIG. 6.

At 930, the memory device may perform an action associated with the condition of the memory array. For example, the memory device may transmit, from the memory device to a host device, an indicator of the condition of the memory array. In another example, the memory device may increase a number of rows to be scrubbed during an execution of a scrub command. In another example, the memory device may increase a rate for scrubbing the memory array. The operations of 930 may be performed according to the methods described herein. In some examples, aspects of the operations of 930 may be performed by an indicator transmitter as described with reference to FIG. 6.

Figure 10:
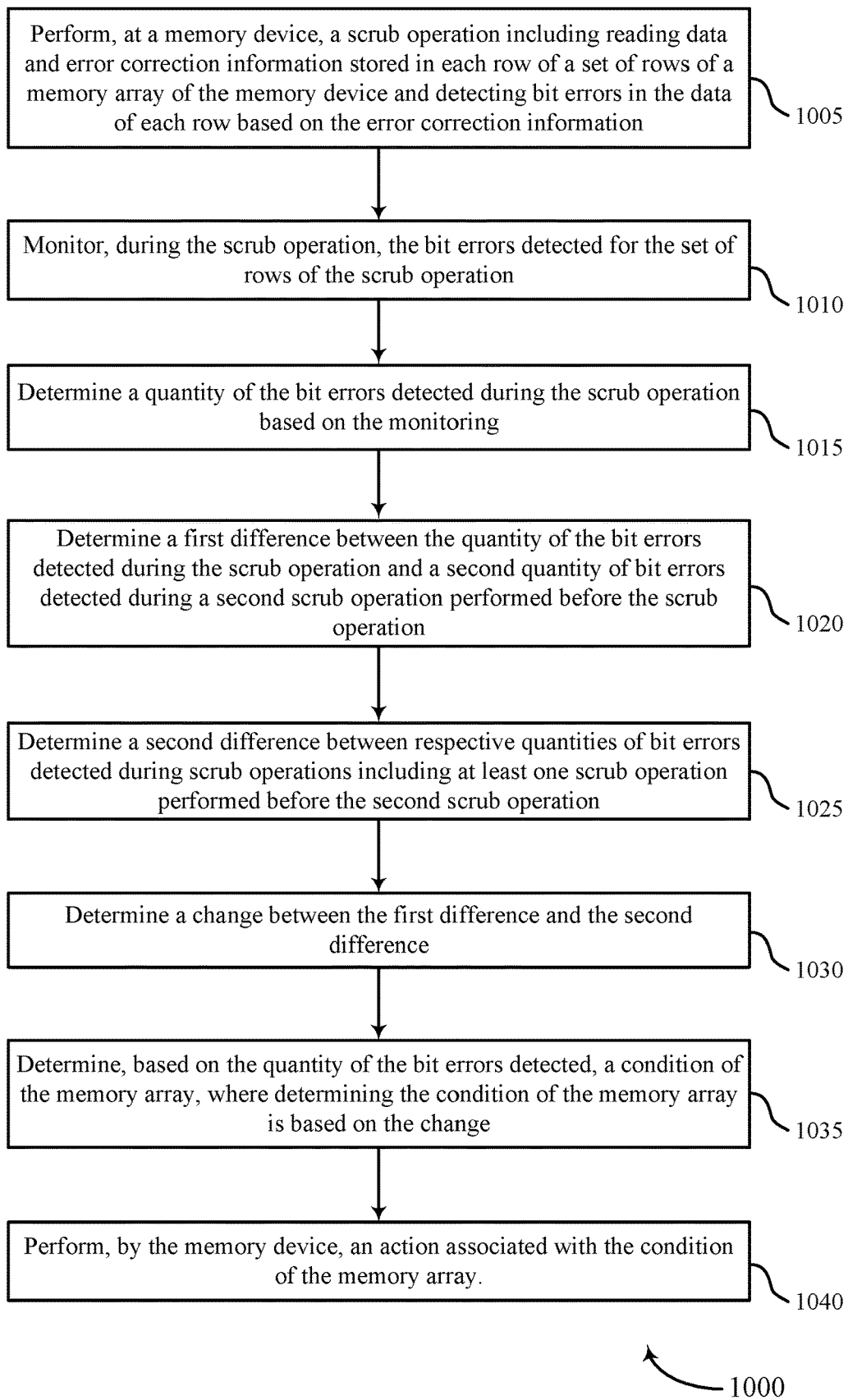

FIG. 10 shows a flowchart illustrating a method or methods 1000 that supports scrub rate control for a memory device in accordance with examples as disclosed herein. The operations of method 1000 may be implemented by a memory device or its components as described herein. For example, the operations of method 1000 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 1005, the memory device may perform, at a memory device, a scrub operation including reading data and error correction information stored in each row of a set of rows of a memory array of the memory device and detecting bit errors in the data of each row based on the error correction information. The operations of 1005 may be performed according to the methods described herein. In some examples, aspects of the operations of 1005 may be performed by a scrub operation manager as described with reference to FIG. 6.

At 1010, the memory device may monitor, during the scrub operation, the bit errors detected for the set of rows of the scrub operation. The operations of 1010 may be performed according to the methods described herein. In some examples, aspects of the operations of 1010 may be performed by an error monitor as described with reference to FIG. 6.

At 1015, the memory device may determine a quantity of the bit errors detected during the scrub operation based on the monitoring. The operations of 1015 may be performed according to the methods described herein. In some examples, aspects of the operations of 1015 may be performed by an error quantity manager as described with reference to FIG. 6.

At 1020, the memory device may determine a first difference between the quantity of the bit errors detected during the scrub operation and a second quantity of bit errors detected during a second scrub operation performed before the scrub operation. The operations of 1020 may be performed according to the methods described herein. In some examples, aspects of the operations of 1020 may be performed by a condition manager as described with reference to FIG. 6.

At 1025, the memory device may determine a second difference between respective quantities of bit errors detected during scrub operations including at least one scrub operation performed before the second scrub operation. The operations of 1025 may be performed according to the methods described herein. In some examples, aspects of the operations of 1025 may be performed by a condition manager as described with reference to FIG. 6.

At 1030, the memory device may determine a change between the first difference and the second difference. The operations of 1030 may be performed according to the methods described herein. In some examples, aspects of the operations of 1030 may be performed by a condition manager as described with reference to FIG. 6.

At 1035, the memory device may determine, based on the quantity of the bit errors detected, a condition of the memory array, where determining the condition of the memory array is based on the change. The operations of 1035 may be performed according to the methods described herein. In some examples, aspects of the operations of 1035 may be performed by a condition manager as described with reference to FIG. 6.

At 1040, the memory device may transmit, from the memory device to a host device, an indicator of the condition of the memory array. The operations of 1040 may be performed according to the methods described herein. In some examples, aspects of the operations of 1040 may be performed by an indicator transmitter as described with reference to FIG. 6.

Figure 11:
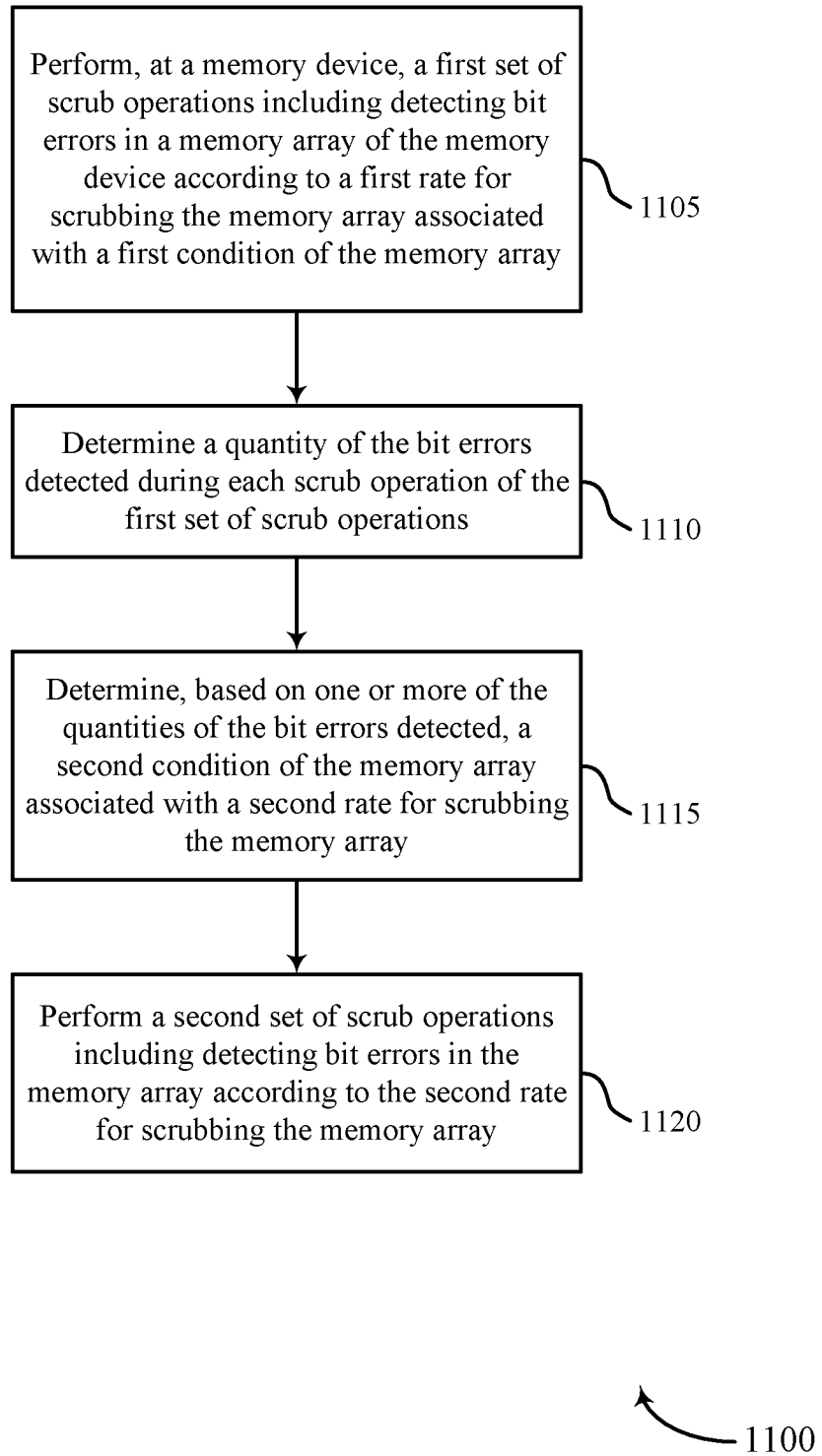

FIG. 11 shows a flowchart illustrating a method or methods 1100 that supports scrub rate control for a memory device in accordance with examples as disclosed herein. The operations of method 1100 may be implemented by a memory device or its components as described herein. For example, the operations of method 1100 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 1105, the memory device may perform, at a memory device, a first set of scrub operations including detecting bit errors in a memory array of the memory device according to a first rate for scrubbing the memory array associated with a first condition of the memory array. The operations of 1105 may be performed according to the methods described herein. In some examples, aspects of the operations of 1105 may be performed by a scrub operation manager as described with reference to FIG. 6.

At 1110, the memory device may determine a quantity of the bit errors detected during each scrub operation of the first set of scrub operations. The operations of 1110 may be performed according to the methods described herein. In some examples, aspects of the operations of 1110 may be performed by an error quantity manager as described with reference to FIG. 6.

At 1115, the memory device may determine, based on one or more of the quantities of the bit errors detected, a second condition of the memory array associated with a second rate for scrubbing the memory array. The operations of 1115 may be performed according to the methods described herein. In some examples, aspects of the operations of 1115 may be performed by a condition manager as described with reference to FIG. 6.

At 1120, the memory device may perform a second set of scrub operations including detecting bit errors in the memory array according to the second rate for scrubbing the memory array. The operations of 1120 may be performed according to the methods described herein. In some examples, aspects of the operations of 1120 may be performed by a scrub operation manager as described with reference to FIG. 6.

In some examples, an apparatus as described herein may perform a method or methods, such as the method 1100. The apparatus may include features, means, or instructions (e.g., a non-transitory computer-readable medium storing instructions executable by a processor) for performing, at a memory device, a first set of scrub operations including detecting bit errors in a memory array of the memory device according to a first rate for scrubbing the memory array associated with a first condition of the memory array, determining a quantity of the bit errors detected during each scrub operation of the first set of scrub operations, determining, based on one or more of the quantities of the bit errors detected, a second condition of the memory array associated with a second rate for scrubbing the memory array, and performing a second set of scrub operations including detecting bit errors in the memory array according to the second rate for scrubbing the memory array.

Some examples of the method 1100 and the apparatus described herein may further include operations, features, means, or instructions for transmitting, to a host device, an indicator of the second condition of the memory array.

Some cases of the method 1100 and the apparatus described herein may further include operations, features, means, or instructions for receiving a first set of scrub commands from a host device according to the first rate for scrubbing the memory array, where performing the first set of scrub operations according to the first rate may be based on the receiving the first set of scrub commands, and receiving a second set of scrub commands from the host device according to the second rate for scrubbing the memory array, where performing the second set of scrub operations according to the second rate may be based on receiving the second set of scrub commands.

Some instances of the method 1100 and the apparatus described herein may further include operations, features, means, or instructions for receiving, prior to performing the first set of scrub operations, a configuration for performing scrub operations, the configuration indicating the first rate for scrubbing the memory array, and determining the second rate for scrubbing the memory array based on determining the second condition of the memory array, where performing the second set of scrub operations may be based on determining the second rate for scrubbing the memory array.

In some cases of the method 1100 and the apparatus described herein, the second condition of the memory array corresponds to lower integrity of data being stored at the memory array than the first condition of the memory array, and the second rate for scrubbing the memory array may be greater than the first rate for scrubbing the memory array.

Some instances of the method 1100 and the apparatus described herein may further include operations, features, means, or instructions for comparing the quantity of the bit errors detected during one of the first set of scrub operations to one or more thresholds, where determining the second condition of the memory array may be based on the comparing.

Some examples of the method 1100 and the apparatus described herein may further include operations, features, means, or instructions for determining a difference between respective quantities of the bit errors detected during a first scrub operation and a second scrub operation of the first set of scrub operations, where determining the second condition of the memory array may be based on the difference.

Some cases of the method 1100 and the apparatus described herein may further include operations, features, means, or instructions for determining a first difference between respective quantities of the bit errors detected during a first subset of the first set of scrub operations, determining a second difference between respective quantities of the bit errors detected during a second subset of the first set of scrub operations including at least one scrub operation performed after the first subset of the first set of scrub operations, and determining a change between the first difference and the second difference, where determining the second condition of the memory array may be based on the change.

Some instances of the method 1100 and the apparatus described herein may further include operations, features, means, or instructions for receiving, from a host device, a set of scrub commands that each correspond to a portion of data stored in the memory array, reading, for each of the portions of data, first data and error correction information from the memory array, performing, for the each of the portions of data, an error correction operation on the first data read from the memory array to generate second data, where performing the error correction operation may be based on the error correction information, and writing, for the each of the portions of data, the second data to the memory array, where performing each of the first set of scrub operations may be based on the writing.

It should be noted that the methods described above describe possible implementations, and that the operations and the steps may be rearranged or otherwise modified and that other implementations are possible. Furthermore, portions from two or more of the methods may be combined.

In some examples, an apparatus with scrub rate control for a memory device may perform aspects of the function described herein using general- or special-purpose hardware. The apparatus may include an array of memory cells, circuitry coupled with the array of memory cells. The circuitry may be operable to cause the apparatus to, monitor, during the scrub operation, the bit errors detected for the set of rows of the scrub operation, determine a quantity of the bit errors detected during the scrub operation based on the monitoring, determine, based on the quantity of the bit errors detected, a condition of the array of memory cells, and perform, by the apparatus, an action associated with the condition of the memory array.

In some cases, the circuitry may be further operable to cause the apparatus to transmit, to a host device, an indicator of the condition of the array of memory cells based on performing the action associated with the condition of the memory array.

In some cases, the circuitry may be further operable to cause the apparatus to receive, from the host device, a first set of scrub commands according to a first rate for scrubbing the array of memory cells, where performing the scrub operation may be based on receiving the first set of scrub commands, and receive, from the host device after transmitting the indicator of the condition of the array of memory cells to the host device, a second set of scrub commands according to a second rate for scrubbing the array of memory cells that may be greater than the first rate.

In some instances, the circuitry may be further operable to cause the apparatus to receive, from a host device, a first set of scrub commands, where performing the scrub operation includes performing the reading and the detecting of the bit errors for a first quantity of the set of rows of the array of memory cells for each of the first set of scrub commands. The circuitry may be operable to cause the apparatus to receive, from the host device, a second set of scrub commands after receiving the first plurality of scrub commands, and perform, based on performing the action associated with the condition of the memory array, a second scrub operation including reading the data and the error correction information stored in each row of the set of rows of the array of memory cells and detect bit errors in the data of each row based on the error correction information, where performing the second scrub operation includes performing the reading and the detecting of the bit errors for a second quantity of the set of rows of the array of memory cells for each of the second set of scrub commands, and where the second quantity of the set rows may be greater than the first quantity of the set of rows.

In some examples, the circuitry may be further operable to cause the apparatus to compare the quantity of the bit errors detected to one or more thresholds, where determining the condition of the array of memory cells may be based on the comparing.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   performing, at a memory device, a scrub operation comprising reading data and error correction information stored in each row of a plurality of rows of a memory array of the memory device and detecting bit errors in the data of each row based at least in part on the error correction information;
   monitoring, during the scrub operation, the bit errors detected for the plurality of rows of the scrub operation;
   determining a quantity of the bit errors detected during the scrub operation based at least in part on the monitoring;
   determining, from three or more conditions of the memory array each associated with a corresponding level of integrity of data stored at the memory array, a condition of the memory array based at least in part on the quantity of the bit errors detected; and
   performing, by the memory device, an action associated with the condition of the memory array.

2. The method of claim 1, further comprising:
   comparing the quantity of the bit errors detected to two or more thresholds, wherein determining the condition of the memory array is based at least in part on the comparing.

3. A method, comprising:
   performing, at a memory device, a scrub operation comprising reading data and error correction information stored in each row of a plurality of rows of a memory array of the memory device and detecting bit errors in the data of each row based at least in part on the error correction information;
   monitoring, during the scrub operation, the bit errors detected for the plurality of rows of the scrub operation;
   determining a quantity of the bit errors detected during the scrub operation based at least in part on the monitoring;
   determining a difference between the quantity of the bit errors detected during the scrub operation and a second quantity of bit errors detected during a second scrub operation performed before the scrub operation;
   determining, based at least in part on the quantity of the bit errors detected and the difference, a condition of the memory array;
   performing, by the memory device, an action associated with the condition of the memory array.

4. A method, comprising:
   performing, at a memory device, a scrub operation comprising reading data and error correction information stored in each row of a plurality of rows of a memory array of the memory device and detecting bit errors in the data of each row based at least in part on the error correction information;
   monitoring, during the scrub operation, the bit errors detected for the plurality of rows of the scrub operation;
   determining a quantity of the bit errors detected during the scrub operation based at least in part on the monitoring;
   determining a first difference between the quantity of the bit errors detected during the scrub operation and a second quantity of bit errors detected during a second scrub operation performed before the scrub operation;
   determining a second difference between respective quantities of bit errors detected during scrub operations including at least one scrub operation performed before the second scrub operation;
   determining a change between the first difference and the second difference;
   determining, based at least in part on the quantity of the bit errors detected and the change, a condition of the memory array; and
   performing, by the memory device, an action associated with the condition of the memory array.

5. The method of claim 1, further comprising:
   storing the error correction information for the plurality of rows of the memory array of the memory device, wherein performing the scrub operation further comprises:
   comparing the data and the error correction information stored in each row of the plurality of rows of the memory array.

6. The method of claim 1, wherein performing the action comprises transmitting, from the memory device to a host device, an indicator of the condition of the memory array.

7. The method of claim 6, further comprising:
   receiving, from the host device, a first plurality of scrub commands according to a first rate for scrubbing the memory array, wherein performing the scrub operation is based at least in part on receiving the first plurality of scrub commands; and
   receiving, from the host device after transmitting the indicator of the condition of the memory array to the host device, a second plurality of scrub commands according to a second rate for scrubbing the memory array that is greater than the first rate.

8. The method of claim 7, wherein the second rate is based at least in part on the condition of the memory array.

9. The method of claim 7, wherein the first rate is based at least in part on a voltage, or a temperature, or both associated with the memory array.

10. The method of claim 1, further comprising:
    determining that the condition of the memory array has changed from a first condition to a second condition associated with a lower integrity of data stored at the memory array than the first condition, wherein determining the condition of the memory array is based at least in part on the determining that the condition of the memory array has changed.

11. The method of claim 10, further comprising:
    receiving, from a host device, an indication of a first rate for scrubbing the memory array, the first rate associated with the first condition, wherein performing the scrub operation is based at least in part on receiving the indication of the first rate for scrubbing the memory array;
    determining, at the memory device, a second rate for scrubbing the memory array based at least in part on determining that the condition of the memory array has changed from the first condition to the second condition; and performing a second scrub operation according to the second rate for scrubbing the memory array.

12. The method of claim 10, further comprising:

generating, by the memory device, a first plurality of scrub commands for scrubbing the memory array according to a first rate based at least in part on the first condition, wherein performing the scrub operation is based at least in part on generating the first plurality of scrub commands; and generating, by the memory device based at least in part on performing the action associated with the condition of the memory array, a second plurality of scrub commands for scrubbing the memory array according to a second rate that is greater than the first rate.

13. The method of claim 1, further comprising:

correcting the bit errors in the data of each row based at least in part on detecting the bit errors in the data of each row.

14. The method of claim 13, wherein performing the scrub operation comprises:

receiving, from a host device, a plurality of scrub commands that each correspond to one or more of the plurality of rows of the memory array;

performing, for each of the plurality of scrub commands, an error correction operation on the data read from the memory array for the one or more of the plurality of rows to generate second data based at least in part on the error correction information; and writing, for the each of the plurality of scrub commands, the second data to the one or more of the plurality of rows of the memory array.

15. A method, comprising:

performing, at a memory device, a scrub operation comprising reading data and error correction information stored in each row of a plurality of rows of a memory array of the memory device, detecting bit errors in the data of each row based at least in part on the error correction information, and correcting the bit errors in the data of each row based at least in part on detecting the bit errors in the data of each row, wherein performing the scrub operation comprises:

receiving, from a host device, a plurality of scrub commands that each correspond to one or more of the plurality of rows of the memory array;

performing, for each of the plurality of scrub commands, an error correction operation on the data read from the memory array for the one or more of the plurality of rows to generate second data based at least in part on the error correction information;

writing, for the each of the plurality of scrub commands, the second data to the one or more of the plurality of rows of the memory array; and performing the reading and the correcting of the bit errors for a first quantity of the plurality of rows of the memory array for each of the plurality of scrub commands;

monitoring, during the scrub operation, the bit errors detected for the plurality of rows of the scrub operation;

determining a quantity of the bit errors detected during the scrub operation based at least in part on the monitoring;

determining, based at least in part on the quantity of the bit errors detected, a condition of the memory array;

performing, by the memory device, an action associated with the condition of the memory array;

receiving, from the host device, a second plurality of scrub commands after receiving the plurality of scrub commands; and performing, based at least in part on performing the action associated with the condition of the memory array, a second scrub operation comprising reading the data and the error correction information stored in each row of the plurality of rows of the memory array and correcting bit errors in the data of each row based at least in part on the error correction information, wherein performing the second scrub operation comprises performing the reading and the correcting of the bit errors for a second quantity of the plurality of rows of the memory array for each of the second plurality of scrub commands, and wherein the second quantity of the plurality of rows is greater than the first quantity of the plurality of rows.

16. The method of claim 1, further comprising:

receiving, from a host device, a set of commands for accessing the memory array; and performing operations indicated by the set of commands for accessing the memory array, wherein performing the scrub operation is based at least in part on performing the operations.

17. A method, comprising:

performing, at a memory device, a first set of scrub operations comprising detecting bit errors in a memory array of the memory device according to a first rate for scrubbing the memory array associated with a first condition of the memory array that indicates a first level of integrity of data stored at the memory array;

determining a quantity of the bit errors detected during each scrub operation of the first set of scrub operations;

determining, from three or more conditions of the memory array each associated with a corresponding of integrity of data stored at the memory array, a second condition of the memory array based at least in part on one or more quantities of the bit errors detected, wherein the second condition of the memory array is associated with a second rate for scrubbing the memory array and indicates a second integrity of data stored at the memory array; and performing a second set of scrub operations comprising detecting bit errors in the memory array according to the second rate for scrubbing the memory array.

18. The method of claim 17, further comprising:

transmitting, to a host device, an indicator of the second condition of the memory array.

19. The method of claim 17, further comprising:

receiving a first plurality of scrub commands from a host device according to the first rate for scrubbing the memory array, wherein performing the first set of scrub operations according to the first rate is based at least in part on the receiving the first plurality of scrub commands; and receiving a second plurality of scrub commands from the host device according to the second rate for scrubbing the memory array, wherein performing the second set of scrub operations according to the second rate is based at least in part on receiving the second plurality of scrub commands.

20. The method of claim 17, further comprising:

receiving, prior to performing the first set of scrub operations, a configuration for performing scrub operations, the configuration indicating the first rate for scrubbing the memory array; and determining the second rate for scrubbing the memory array based at least in part on determining the second condition of the memory array, wherein performing the second set of scrub operations is based at least in part on determining the second rate for scrubbing the memory array.

21. The method of claim 17, wherein:
the second condition of the memory array corresponds to a lower level of integrity of data being stored at the memory array than the first condition of the memory array; and
the second rate for scrubbing the memory array is greater than the first rate for scrubbing the memory array.

22. The method of claim 17, further comprising:
comparing the quantity of the bit errors detected during one of the first set of scrub operations to two or more thresholds, wherein determining the second condition of the memory array is based at least in part on the comparing.

23. The method of claim 17, further comprising:
determining a difference between respective quantities of the bit errors detected during a first scrub operation and a second scrub operation of the first set of scrub operations, wherein determining the second condition of the memory array is based at least in part on the difference.

24. The method of claim 17, further comprising:
determining a first difference between respective quantities of the bit errors detected during a first subset of the first set of scrub operations;
determining a second difference between respective quantities of the bit errors detected during a second subset of the first set of scrub operations including at least one scrub operation performed after the first subset of the first set of scrub operations; and
determining a change between the first difference and the second difference, wherein determining the second condition of the memory array is based at least in part on the change.

25. The method of claim 17, further comprising:
receiving, from a host device, a plurality of scrub commands that each correspond to a portion of data stored in the memory array;
reading, for each of the portions of data, first data and error correction information from the memory array;
performing, for the each of the portions of data, an error correction operation on the first data read from the memory array to generate second data, wherein performing the error correction operation is based at least in part on the error correction information; and
writing, for the each of the portions of data, the second data to the memory array, wherein performing each of the first set of scrub operations is based at least in part on the writing.

26. An apparatus, comprising:
an array of memory cells; and
circuitry coupled with the array of memory cells and operable to cause the apparatus to:
perform a scrub operation comprising reading data and error correction information stored in each row of a plurality of rows of the array of memory cells and detecting bit errors in the data of each row based at least in part on the error correction information;
monitor, during the scrub operation, the bit errors detected for the plurality of rows of the scrub operation;
determine a quantity of the bit errors detected during the scrub operation based at least in part on the monitoring;
determine, from three or more conditions of the array of memory cells each associated with a corresponding level of integrity of data stored at the array of memory cells, a condition of the array of memory cells based at least in part on the quantity of the bit errors detected; and
perform, by the apparatus, an action associated with the condition of the array of memory cells.

27. The apparatus of claim 26, wherein the circuitry is further operable to cause the apparatus to transmit, to a host device, an indicator of the condition of the array of memory cells based at least in part on performing the action associated with the condition of the array of memory cells.

28. The apparatus of claim 27, wherein the circuitry is further operable to cause the apparatus to:
receive, from the host device, a first plurality of scrub commands according to a first rate for scrubbing the array of memory cells, wherein performing the scrub operation is based at least in part on receiving the first plurality of scrub commands; and
receive, from the host device after transmitting the indicator of the condition of the array of memory cells to the host device, a second plurality of scrub commands according to a second rate for scrubbing the array of memory cells that is greater than the first rate.

29. An apparatus, comprising:
an array of memory cells; and
circuitry coupled with the array of memory cells and operable to cause the apparatus to:
perform a scrub operation comprising reading data and error correction information stored in each row of a plurality of rows of the array of memory cells and detecting bit errors in the data of each row based at least in part on the error correction information;
receive, from a host device, a first plurality of scrub commands, wherein performing the scrub operation comprises performing the reading and the detecting of the bit errors for a first quantity of the plurality of rows of the array of memory cells for each of the first plurality of scrub commands;
monitor, during the scrub operation, the bit errors detected for the plurality of rows of the scrub operation;
determine a quantity of the bit errors detected during the scrub operation based at least in part on the monitoring;
determine, based at least in part on the quantity of the bit errors detected, a condition of the array of memory cells;
perform, by the apparatus, an action associated with the condition of the array of memory cells;
receive, from the host device a second plurality of scrub commands after receiving the first plurality of scrub commands; and
perform, based at least in part on performing the action associated with the condition of the array of memory cells, a second scrub operation comprising reading the data and the error correction information stored in each row of the plurality of rows of the array of memory cells and detect bit errors in the data of each row based at least in part on the error correction information, wherein performing the second scrub operation comprises performing the reading and the detecting of the bit errors for a second quantity of the plurality of rows of the array of memory cells for each of the second plurality of scrub commands, and wherein the second quantity of the plurality of rows is greater than the first quantity of the plurality of rows.

30. The apparatus of claim 26, wherein the circuitry is further operable to cause the apparatus to:

compare the quantity of the bit errors detected to two or more thresholds, wherein determining the condition of the array of memory cells is based at least in part on the comparing.

\* \* \* \* \*